United States Patent
Byrne et al.

(10) Patent No.: US 10,516,880 B2
(45) Date of Patent: Dec. 24, 2019

(54) COORDINATED VIEW DISPLAY DEVICE

(71) Applicant: TAIT TOWERS MANUFACTURING, LLC, Lititz, PA (US)

(72) Inventors: Owen Byrne, Lancaster, PA (US); Boris Kalaba, Lititz, PA (US); Adam Davis, Leola, PA (US); Ryan Mast, Lancaster, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 67 days.

(21) Appl. No.: 16/078,734

(22) PCT Filed: Feb. 21, 2017

(86) PCT No.: PCT/US2017/018713
§ 371 (c)(1),
(2) Date: Aug. 22, 2018

(87) PCT Pub. No.: WO2017/147070
PCT Pub. Date: Aug. 31, 2017

(65) Prior Publication Data
US 2019/0058876 A1    Feb. 21, 2019

(51) Int. Cl.
*H04N 13/393* (2018.01)
(52) U.S. Cl.
CPC .................... *H04N 13/393* (2018.05)
(58) Field of Classification Search
CPC .................................................. H04N 13/393
See application file for complete search history.

(56) References Cited

U.S. PATENT DOCUMENTS

| | | | |
|---|---|---|---|
| 4,698,682 | A | 10/1987 | Astle |
| 4,946,045 | A | 8/1990 | Ditchburn et al. |
| 5,302,965 | A | 4/1994 | Belcher et al. |
| 6,721,023 | B1 | 4/2004 | Weiss et al. |
| 2002/0008674 | A1 | 1/2002 | Son et al. |

(Continued)

FOREIGN PATENT DOCUMENTS

WO    2015100310 A1    7/2015

*Primary Examiner* — Mishawn N. Hunter
(74) *Attorney, Agent, or Firm* — McNees Wallace & Nurick LLC

(57) ABSTRACT

There is provided a coordinated view-display device, a system for creating a three-dimensional display, and a process of creating a three-dimensional display. The display device includes a rotatable portion and a plurality of light-emitting elements connected to the rotatable portion. Rotation of the rotatable portion rotates the light-emitting elements and displays a sequence of images corresponding with segmented image data as an illusion of a continuous three-dimensional image. The system includes an array arranged and disposed to gather segmented image data and a display arranged and disposed to display a sequence of images corresponding with the segmented image data. The displaying forms an illusion of a continuous three-dimensional image. The process includes gathering segmented image data and displaying a sequence of images corresponding with the segmented image data. The displaying forms may provide an illusion of a continuous three-dimensional image.

6 Claims, 26 Drawing Sheets

(56) References Cited

U.S. PATENT DOCUMENTS

2007/0081207 A1    4/2007   Bimber
2008/0316201 A1   12/2008   Nayar et al.
2012/0140131 A1    6/2012   Lanman et al.
2014/0051510 A1    2/2014   Benko et al.
2017/0134721 A1*   5/2017   Byrne .................. H04N 13/393

* cited by examiner

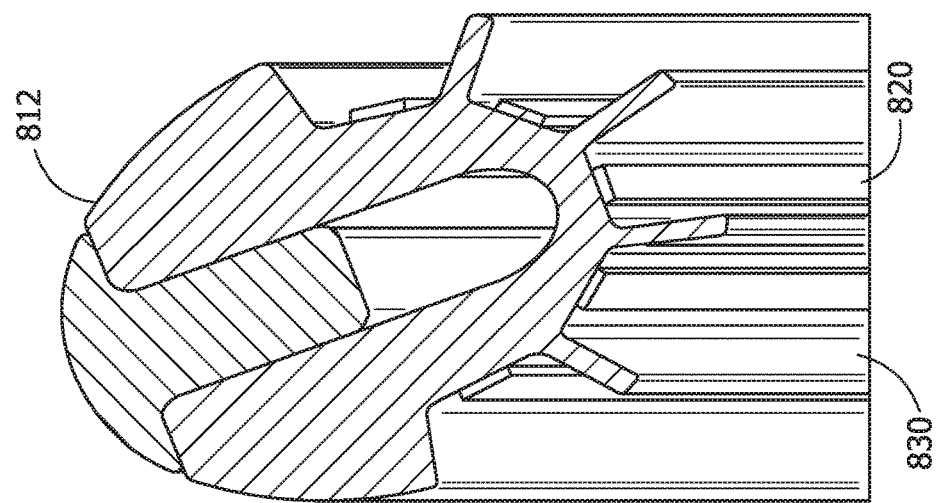
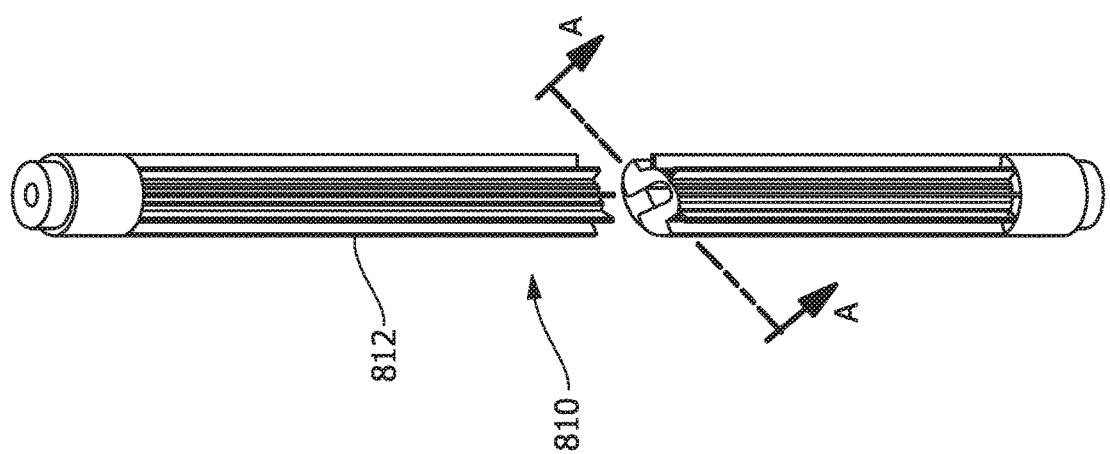
FIG. 21
FIG. 20

COORDINATED VIEW DISPLAY DEVICE

CROSS REFERENCE TO RELATED PATENT APPLICATIONS

This application claims the benefit of U.S. Nonprovisional patent application Ser. No. 15/049,606, entitled "COORDINATED VIEW DISPLAY DEVICE" and filed Feb. 22, 2016, and benefit to U.S. Provisional Patent Application No. 62/251,834, entitled "THREE-DIMENSIONAL DISPLAY DEVICE, SYSTEM FOR CREATING THREE-DIMENSIONAL DISPLAY, AND PROCESS OF CREATING THREE-DIMENSIONAL DISPLAY" filed Nov. 6, 2015, which is hereby incorporated by reference in its entirety.

FIELD OF THE INVENTION

The present invention is directed to display devices, display systems, and display processes. More specifically, the present invention is directed to a coordinated view display device that provides a three-dimensional visual display.

BACKGROUND OF THE INVENTION

It is well known since before the days of motion pictures that one can create an illusion of a moving image by the display of a rapid succession of still images. A number of drawbacks exist with the creation of the illusion of motion from a sequence of still images. For example, U.S. Pat. No. 4,698,682 discloses that graphic images can appear jerky if the size and speed at which pixels change are perceived by a viewer. Removing the jerkiness can involve decreasing pixel size or increasing the rate at which still images are displayed, either of which can be expensive and impracticable, for example, due to the large amount of data to be gathered and utilized. To resolve such drawbacks, a known technique, according to U.S. Pat. No. 4,698,682, is to morph the color of individual pixels, thereby rendering the transition imperceptible. However, creating an illusion of a three-dimensional moving image exacerbates the complications.

The amount of data associated with a three-dimensional image is much greater than that associated with a two-dimensional image. U.S. Pat. No. 4,946,045 discloses a method and apparatus for collecting such data. For example, the technique includes a concentric arrangement of electronic viewers in a single plane each at the same angle with an unobscured view of an object. The electronic viewers collect data of the object, such as, geometry, amount of transparency, amount of translucency, amount of refractivity, and amount of reflectivity. Based upon the gathered data the apparatus sorts the objects.

A coordinated view display device, a system for creating a three-dimensional display with such a device, and a process of creating a three-dimensional display, that do not suffer from one or more of the above drawbacks, would be desirable in the art.

SUMMARY OF THE INVENTION

In an exemplary embodiment, a coordinated view display device includes a rotatable portion and a plurality of light-emitting elements connected to the rotatable portion. Rotation of the rotatable portion rotates the light-emitting elements, thereby displaying an illusion of a three-dimensional image corresponding to a sequence of segmented images.

In another exemplary embodiment, a system for creating a three-dimensional display includes an array arranged and disposed to gather segmented image data and a display arranged and disposed to display a sequence of images corresponding with the segmented image data. The displaying forms an illusion of a three-dimensional image.

In another exemplary embodiment, a process of creating a three-dimensional display includes gathering segmented image data and displaying a sequence of images corresponding with the segmented image data. The displaying forms an illusion of a three-dimensional image.

In an additional exemplary embodiment, a three-dimensional display device includes a rotatable portion and a plurality of light-emitting elements connected to the rotatable portion. Rotation of the rotatable portion rotates the light-emitting elements, thereby displaying segmented images that, when observed by a human observer, create an illusion of a three-dimensional image. This embodiment includes the feature of a plurality of image display surfaces each disposed between a respective pair of view restricting elements. The image displaying portions and the view restricting elements are commonly mounted in an angular manner on a rotating element. Via appropriate control of the rotation of the rotating element and appropriate control of the images displayed via the image displaying elements, an observer of the assembly perceives that a three-dimensional image is being viewed, with this visual effect being facilitated by the persistence of motion phenomena.

In a variation of an additional exemplary embodiment, a coordinated view display device is provided in the form of an arrangement for presenting a display. The arrangement includes an advancing device, an upstream collection group, and a downstream collection group. The advancing device has a travel portion and is operable to cyclically advance the travel portion along a circular path in an advancing direction, the circular path having a radius and the travel portion moving in an angular direction relative to the circular path. The upstream collection group delimits at least two sight-reducing elements supported on the travel portion of the advancing device for advancing movement thereby.

The downstream collection group delimits at least two sight-reducing elements supported on the travel portion of the advancing device for advancing movement thereby. Additionally, the arrangement for presenting a display includes an ingress associated with each of the upstream sight-reducing elements, each ingress delimiting a threshold through which light travels, and a view window associated with each of the upstream sight-reducing elements, wherein light at the view window can be viewed by an observer located at a given angular location relative to the circular path, the view window having a display range available at each angular position of the view window that delimits an available angular extent within which the view window is viewable, wherein, across a plurality of different angular positions of the display range that the display range occupies as the view window displaces angularly during the advancing movement, observers who have a line of sight to the display range can view light at the view window through a predetermined extent of angular displacement of the view window. Furthermore, an arrangement for presenting a display includes an ingress associated with each of the downstream sight-reducing elements, each ingress delimiting a threshold through which light travels and a view window associated with each of the downstream sight-reducing elements, wherein light at the view window can be viewed by an observer located at a given angular location relative to the circular path, the view window having a display range available at each angular position of the view window that delimits an available angular extent within which the view window is viewable, wherein, across a plurality of different angular positions of the display range that the display range occupies as the view window displaces angularly during the advancing movement, observers who have a line of sight to the display range can view light at the view window through a predetermined extent of angular displacement of the view window.

The view windows associated with the downstream collection group are located downstream of the view windows associated with the upstream collection group relative to the advancing direction of the travel portion along the circular path such that, during each full cycle travel of the travel portion of the advancing device along the circular path, the view windows associated with the downstream collection group cyclically travel past a given location on the circular path before the view windows associated with the collection group have traveled past the given location. Each view window has a lateral dimension, and a height dimension perpendicular to the lateral dimension that together delimit the area of the view window and having a length extent perpendicular to the lateral dimension and the height dimension.

A respective one of the upstream sight-reducing elements being a lagging upstream sight element and being located relative to a forward one of the upstream sight-reducing elements such that the lagging upstream sight-reducing element, during each full cycle travel of the travel portion of the advancing device along the circular path, reduces the percentage of the display range of the view window of the forward upstream sight-reducing element available within the line of sight of an observer remaining at a fixed angular location, whereupon, during each cycle of travel, the display range of the view window of the forward upstream sight-reducing element is available to an observer remaining at a fixed angular location such that the observer is able to cyclically view the display range of the view window of the forward upstream sight-reducing element through a predetermined extent of angular displacement of the view window and the lagging upstream sight-reducing element progressively reduces to zero the percentage of the display range of the view window of the forward upstream sight-reducing element available to be viewed by the observer as a function of the advancing movement of the view window. A respective one of the downstream sight-reducing elements being a lagging downstream sight element and being located relative to a forward one of the downstream sight-reducing elements such that the lagging downstream sight-reducing element, during each full cycle travel of the travel portion of the advancing device along the circular path, reduces the percentage of the display range of the view window of the forward downstream sight-reducing element available within the line of sight of an observer remaining at a fixed angular location, whereupon, during each cycle of travel, the display range of the view window of the forward downstream sight-reducing element is available to an observer remaining at a fixed angular location such that the observer is able to cyclically view the display range of the view window of the forward downstream sight-reducing element through a predetermined extent of angular displacement of the view window and the lagging downstream sight-reducing element progressively reduces to zero the percentage of the display range of the view window of the forward downstream sight-reducing element available to be viewed by the observer as a function of the advancing movement of the view window. At least a selected one of the one pair of the lagging upstream sight-reducing element and the lagging downstream sight-reducing element or the other pair of the forward upstream sight-reducing element and the forward downstream sight-reducing element is an operatively associated pair in a manner in which the view windows of the operatively associated pair have a predetermined orientation with one another, with the view window of the respective one of the lagging upstream sight-reducing element or the forward upstream sight-reducing element of the operatively associated pair delimiting a reference bisector plane extending in the length direction of the view window such that one-half of the area of the view window lies on one side of the reference bisector plane and the other half of the area of the view window lies on the opposite side of the reference bisector plane and the view window of the respective one of the lagging downstream sight-reducing element or the forward downstream sight-reducing element of the operatively associated pair delimits an offset bisector plane extending in the length direction of the view window such that one-half of the area of the view window lies on one side of the offset bisector plane and the other half of the area of the view window lies on the opposite side of the offset bisector plane. The reference bisector plane of the view window of the respective upstream sight-reducing element and the offset bisector plane of the view window of the respective downstream sight-reducing element is at an offset angle to one another greater than zero.

In a further embodiment, an arrangement for presenting a display, the arrangement comprising an advancing device, the advancing device having a travel portion and being operable to cyclically advance the travel portion along a circular path in an advancing direction. The arrangement further includes an upstream collection group, the upstream collection group having at least a first pair of passageway portions and a second pair of passageway portions, and a downstream collection group, the downstream collection group having at least a first pair of passageway portions and a second pair of passageway portions. The arrangement further includes each of the first pair of passageway portions of the upstream collection group and the downstream collection group being supported on the travel portion of the advancing device for advancing movement thereby, and each of the first pair of passageway portions of the upstream collection group and the downstream collection group delimiting a first passageway having a first length direction, a first lateral direction perpendicular to the first length direction, and a first height direction perpendicular to the first length direction and the first lateral direction. The arrangement further includes a first ingress, the first ingress delimiting a threshold through which light travels into the first passageway, a respective area of the first passageway, as viewed in the first lateral and first height directions, having light passing therethrough and being deemed a first view window of the first passageway. Light at the first view window can be viewed by an observer and the first pair of passageway portions of the upstream collection group and the downstream collection group being spaced from one another as viewed in the first lateral direction of the first passageway at least along a portion of their extents beyond the first view window as viewed in the first length direction to permit light that has traveled past the first ingress to be viewed by an observer exteriorly of the first passageway. The arrangement further includes each of the second pair of passageway portions of the upstream collection group and the downstream collection group being supported on the travel portion of the advancing device for advancing movement thereby and delimiting a second passageway having a second length direction. The arrangement further includes a second lateral direction perpendicular to the second length direction, and a second height direction perpendicular to the second length direction and the second lateral direction. The arrangement further includes a second ingress, the second ingress delimiting a threshold through which light travels into the second passageway, a respective area of the second passageway, as viewed in the second lateral and second height directions, having light passing therethrough and being deemed a second view window of the second passageway. Light at the second view window can be viewed by the observer and the second pair of passageway portions of the upstream collection group and the downstream collection group being spaced from one another as viewed in a the second lateral direction at least along a portion of their extents sufficient to permit light that has traveled past the second ingress to be viewed by an observer exteriorly of the second passageway. The arrangement further includes the first and second view windows of the first and second passageways of the downstream collection group being located downstream of corresponding first and second view windows of the first and second passageways of the upstream collection group relative to the advancing direction of the travel portion along the circular path such that, during each full cycle travel of the travel portion of the advancing device along the circular path, the first and second view windows of the first and second passageways of the downstream collection group cyclically travel past a given location on the circular path before corresponding first and second view windows of the first and second passageways of the upstream collection group have traveled past the given location. The arrangement further includes the center of the areas of the first and second view windows of the first and second passageways of the upstream collection group lying on a collection circle having a radius less than the radius of the circular path. The arrangement further includes the center of the areas of the first and second view windows of the first and second passageways of the downstream collection group lying on a collection circle having a radius less than the radius of the circular path. The arrangement further includes a selected one of the first and second passageways of the upstream collection group and a selected one of the first and second passageways of downstream collection group being in a coordinated relationship with one another. The selected one passageway of the upstream collection group is deemed to be the upstream coordinated passageway and the selected one passageway of the downstream collection group is deemed to be the downstream coordinated passageway. The upstream coordinated passageway delimits a reference bisector plane extending in one of a corresponding first and second length direction of the upstream coordinated passageway and bisecting one of a corresponding first and second view windows of the upstream coordinated passageway such that one-half of the area of the one of a corresponding first and second view windows lies on one side of the reference bisector plane and the other half of the area of the one of a corresponding first and second view windows lies on the opposite side of the reference bisector plane. The downstream coordinated passageway delimits an offset bisector plane extending in one of a corresponding first and second length direction of the downstream coordinated passageway and bisecting one of a corresponding first and second view windows of the downstream coordinated passageway such that one-half of the area of the one of a corresponding first and second view windows lies on one side of the offset bisector plane and the other half of the area of the one of a corresponding first and second view windows lies on the opposite side of the offset bisector plane. The arrangement further includes the reference bisector plane of the upstream coordinated passageway and the offset bisector plane of the downstream coordinated passageway being at an offset angle to one another.

In yet a further embodiment, arrangement for presenting a display, the arrangement comprising an advancing device, the advancing device having a travel portion and being operable to cyclically advance the travel portion along a circular path in an advancing direction, and the circular path having a radius and the travel portion moving in an angular direction relative to the circular path. The arrangement further includes an upstream collection group, the upstream collection group delimiting at least two sight-reducing elements supported on the travel portion of the advancing device for advancing movement thereby. The arrangement further includes a downstream collection group, the downstream collection group delimiting at least two sight-reducing elements supported on the travel portion of the advancing device for advancing movement thereby. The arrangement further includes an ingress associated with each of the upstream sight-reducing elements, each ingress delimiting a threshold through which light travels. The arrangement further includes a first view window associated with each of the upstream sight-reducing elements, wherein light at the first view window can be viewed by an observer located at a given angular location relative to the circular path. The arrangement further includes the first view window having a display range available at each angular position of the first view window that delimits an available angular extent within which the first view window is viewable. The arrangement further includes wherein, across a plurality of different angular positions of the display range that the display range occupies as the first view window displaces angularly during the advancing movement, observers who have a line of sight to the display range can view light at the first view window through a predetermined extent of angular displacement of the first view window. The arrangement further includes an ingress associated with each of the downstream sight-reducing elements, each ingress delimiting a threshold through which light travels. The arrangement further includes a second view window associated with each of the downstream sight-reducing elements. Light at the second view window can be viewed by an observer located at a given angular location relative to the circular path. The arrangement further includes the second view window having a display range available at each angular position of the second view window that delimits an available angular extent within which the second view window is viewable. The arrangement further includes wherein, across a plurality of different angular positions of the display range that the display range occupies as the second view window displaces angularly during the advancing movement, observers who have a line of sight to the display range can view light at the second view window through a predetermined extent of angular displacement of the second view window. The arrangement further includes the second view window associated with the downstream collection group being located downstream of a corresponding first view window associated with the upstream collection group relative to the advancing direction of the travel portion along the circular path such that, during each full cycle travel of the travel portion of the advancing device along the circular path, each second view window associated with the downstream collection group cyclically travel past a given location on the circular path before the corresponding first view window associated with the upstream collection group have traveled past the given location. The arrangement further includes the first view window having a first lateral dimension, and a first height dimension perpendicular to the first lateral dimension that together delimit the area of the first view window and having a first length extent perpendicular to the first lateral dimension and the first height dimension. The arrangement further includes the second view window having a second lateral dimension, and a second height dimension perpendicular to the second lateral dimension that together delimit the area of the second view window and having a second length extent perpendicular to the second lateral dimension and the second height dimension. The arrangement further includes a respective one of the at least two upstream sight-reducing elements being a lagging upstream sight-reducing element and being located relative to a forward upstream sight-reducing element of the at least two upstream sight-reducing elements such that the lagging upstream sight-reducing element, during each full cycle travel of the travel portion of the advancing device along the circular path, reduces the percentage of the display range of a corresponding one of a first and second view windows of the forward upstream sight-reducing element available within the line of sight of an observer remaining at a fixed angular location. The arrangement further includes, during each cycle of travel, the display range of the corresponding one of a first and second view windows of the forward upstream sight-reducing element is available to an observer remaining at a fixed angular location such that the observer is able to cyclically view the display range of the corresponding one of a first and second view windows of the forward upstream sight-reducing element through a predetermined extent of angular displacement of the corresponding one of a first and second view windows and the lagging upstream sight-reducing element progressively reduces to zero the percentage of the display range of the corresponding one of a first and second view windows of the forward upstream sight-reducing element available to be viewed by the observer. The arrangement further includes a respective one of the at least two downstream sight-reducing elements being a lagging downstream sight-reducing element and being located relative to a forward downstream sight-reducing element of the at least two downstream sight-reducing elements such that the lagging downstream sight-reducing element, during each full cycle travel of the travel portion of the advancing device along the circular path, reduces the percentage of the display range of a corresponding one of a first and second view windows of the forward downstream sight-reducing element available within the line of sight of an observer remaining at a fixed angular location. The arrangement further includes, during each cycle of travel, the display range of the corresponding one of the first and second view window of the forward downstream sight-reducing element is available to an observer remaining at a fixed angular location such that the observer is able to cyclically view the display range of the corresponding one of the first and second view windows of the forward downstream sight-reducing element through a predetermined extent of angular displacement of the corresponding one of the first and second view windows and the lagging downstream sight-reducing element progressively reduces to zero the percentage of the display range of the corresponding one of the first and second view windows of the forward downstream sight-reducing element available to be viewed by the observer. The arrangement further includes at least a selected one of the one pair of the lagging upstream sight-reducing element and the lagging downstream sight-reducing element or the other pair of the forward upstream sight-reducing element and the forward downstream sight-reducing element being an operatively associated pair in a manner in which a corresponding at least one of the first and second view windows of the operatively associated pair have a predetermined orientation with one another. The arrangement further includes the corresponding at least one of the first and second view windows of the respective one of the lagging upstream sight-reducing element or the forward upstream sight-reducing element of the operatively associated pair delimiting a reference bisector plane extending in a corresponding at least one of the first and second length direction of the corresponding at least one of the first and second view window such that one-half of the area of the corresponding at least one of the first and second view window lies on one side of the reference bisector plane. The arrangement further includes the other half of the area of the corresponding at least one of the first and second view windows lies on the opposite side of the reference bisector plane and the corresponding at least one of the first and second view windows of the respective one of the lagging downstream sight-reducing element or the forward downstream sight-reducing element of the operatively associated pair delimiting an offset bisector plane extending in the corresponding at least one of the first and second length direction of the view corresponding at least one of the first and second windows such that one-half of the area of the corresponding at least one of the first and second view windows lies on one side of the offset bisector plane and the other half of the area of the corresponding at least one of the first and second view windows lies on the opposite side of the offset bisector plane. The arrangement further includes the reference bisector plane of the corresponding at least one of the first and second view windows of the respective upstream sight-reducing element and the offset bisector plane of the corresponding at least one of the first and second view windows of the respective downstream sight-reducing element being at an offset angle to one another greater than zero.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 20 is a top perspective view of a post of the assembly of the additional exemplary embodiment shown in FIG. 14 and FIG. 15.

FIG. 21 is an enlarged sectional view, taken along section line A-A in FIG. 20, of the post shown in FIG. 20.

Wherever possible, the same reference numbers will be used throughout the drawings to represent the same parts.

DETAILED DESCRIPTION OF THE INVENTION

Figure 14:
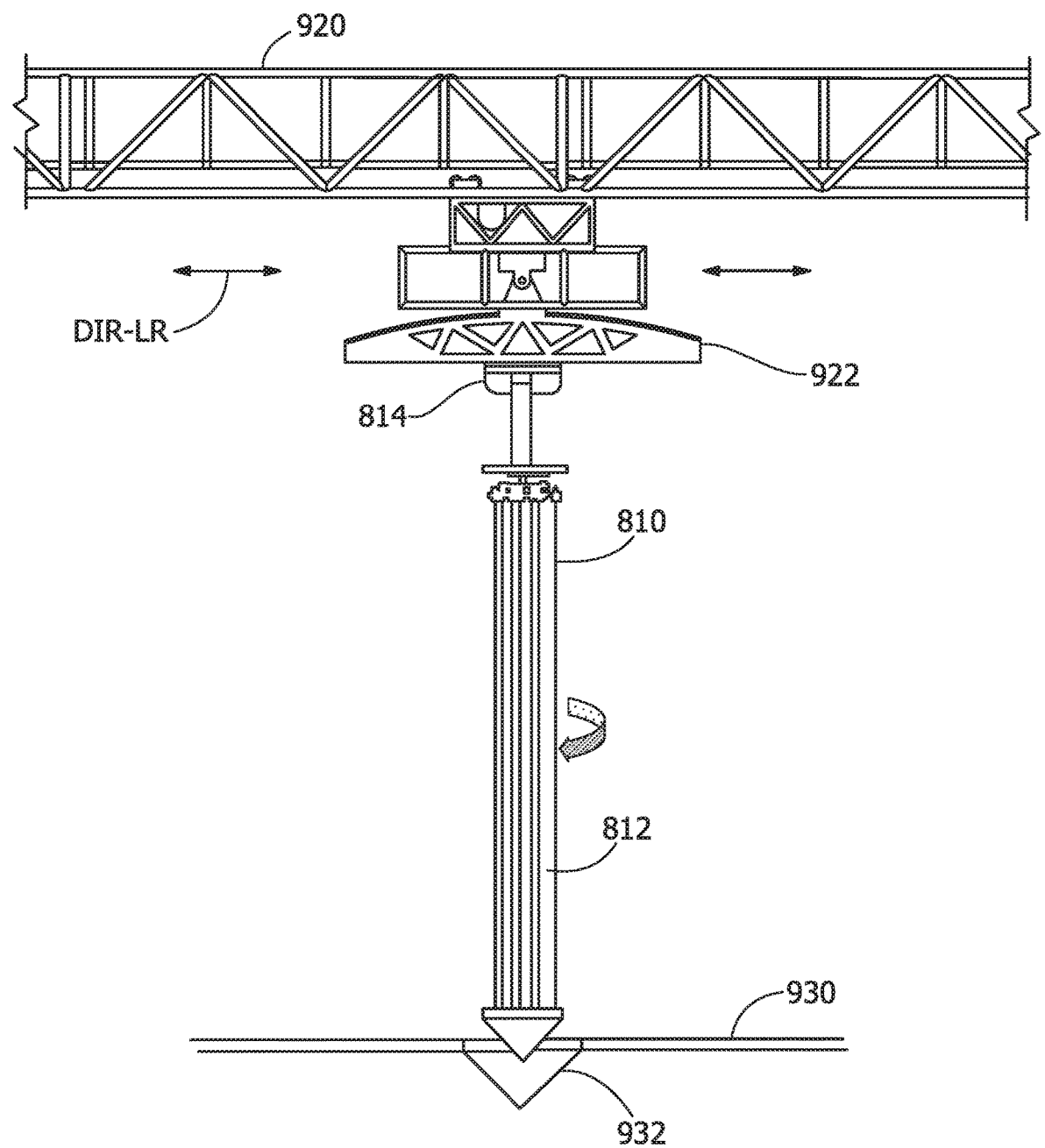
FIG. 14 is a front elevational view of an additional exemplary embodiment of the present invention.

Reference is now made to an additional exemplary embodiment of the present invention, which will be described with reference to FIGS. 14-26. A display arrangement 810 is suspended from a trolley 922 that is slidably movable along a horizontal truss beam 920 that itself may be suspended from, for example, the roof of a building or an arena. The building or the arena may be used full time or on occasion as an entertainment venue, such as, for example, a stage or a theater event. The trolley 922 may be a conventional controllably drivable trolley in that it can be moved in a translation movement relative to a building structure. For example, the trolley 922 is configured with a motor assembly (not shown) that is remotely controlled from a control mechanism (not shown) such that the trolley 922 can be selectively moved relative to a building structure in a pair of opposite horizontal directions DIR-LR, as seen in FIG. 14.

The display arrangement 810 includes a plurality of posts 812, a rotation motor 814, and a lower disc 816. As seen in particular in FIG. 19, solely for illustration purposes, the display arrangement 810 comprises six individual posts that are secured each at a lower axial end to the lower disc 816 and the posts are distributed at equal circumferential spacings along a selected arcuate extent on the lower disc 816. The posts 812 are also each secured at an upper axial end to an upper disc. The posts 812, the upper disc, and the lower disc 816 of the display arrangement 810 collectively form a driven sub-assembly that is drivingly rotated by the rotation motor 814.

The trolley 922 includes a support structure to which is fixedly secured the rotation motor 814 of the display arrangement 810. The rotation motor 814 is connected via a wired connection to a power source (not shown) and is in operative communication with a control mechanism (not shown) such that the rotation of the rotation motor 814 can be selectively controlled. The rotation motor 814 includes an output shaft 922 that is connected to the upper disc of the display arrangement 810, whereupon the rotation motor 814 can be operated to drivingly rotate the driven sub-assembly of the display arrangement 810.

The lower disc 816 of the display arrangement 810 includes a tapered portion receivable in a correspondingly configured conical portion 932 formed in a floor portion 930 of the building. As will be described in more detail herein, the conical portion 932 formed in the floor portion 930 rotatably supports and stabilizes the display arrangement 810 as the driven sub-assembly of the display arrangement 810 is rotatably driven by the rotation motor 814.

As seen in FIG. 20, each individual post 812 includes a plurality of image display surfaces 820 interleaved between adjacent pairs of view modifiers 830. The image display surfaces 820 may be surfaces of video strips, light-emitting diodes, organic light-emitting diodes, fiber optic lights, fluorescent lights, incandescent lights, neon lights, or combinations thereof. In one embodiment, each of the light image display surfaces 820 includes a predetermined number of pixels per inch, for example, between 1 and 100, between 1 and 10, between 1 and 20, between 10 and 20, between 5 and 10, between 3 and 8, between 10 and 50, between 10 and 30, between 30 and 50, between 20 and 40, between 1 and 5, or any suitable combination or subcombination thereof. The arrangement of pixels is substantially uniform or non-uniform along the image display surfaces 820.

Each post 812 has a longitudinal axis extending parallel to the axis of rotation of the driven sub-assembly of the display arrangement 810. The image display surfaces 820 of each individual post 812 are distributed at equal circumferential spacings along a selected arcuate extent of the post, as viewed relative to the longitudinal axis of the post. Each view modifier 830 is configured to project radially outwardly to a greater degree than the respective image display surface 820 disposed between the view modifier and the adjacent view modifier. The placement, the extent to which the view modifier 830 extends radially beyond the respective image display surface 820, the geometry, and the material composition of the view modifier are selected so the view modifier performs a desired view modifying function, as is described in more detail herein.

Figure 17:
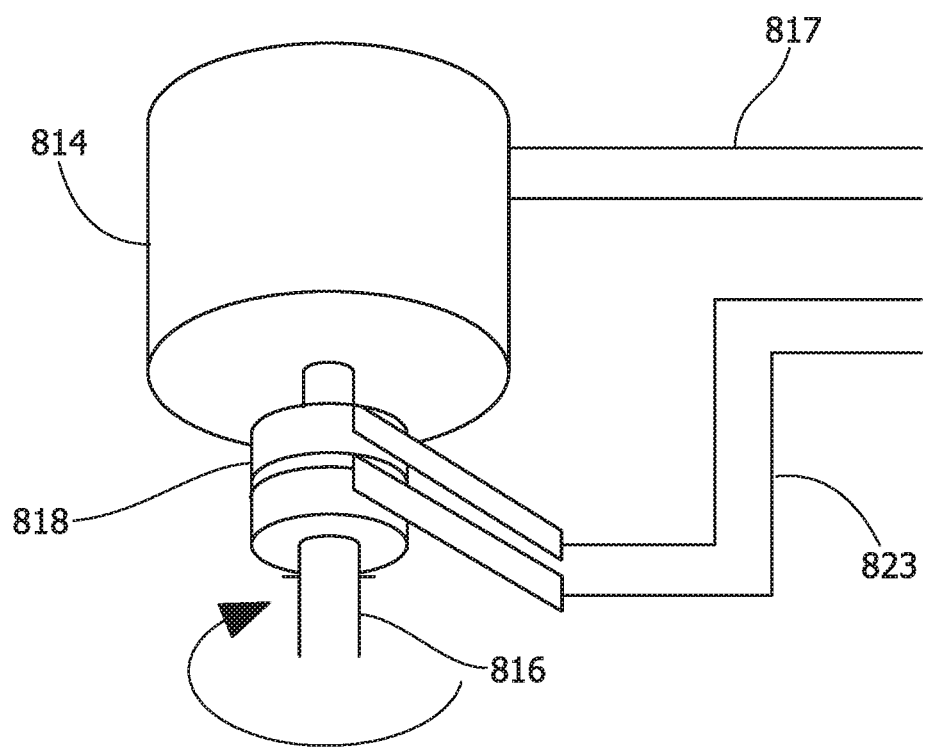
FIG. 17 is a bottom perspective view of the rotation motor of the assembly shown in FIG. 14 and FIG. 15.
Figure 19:
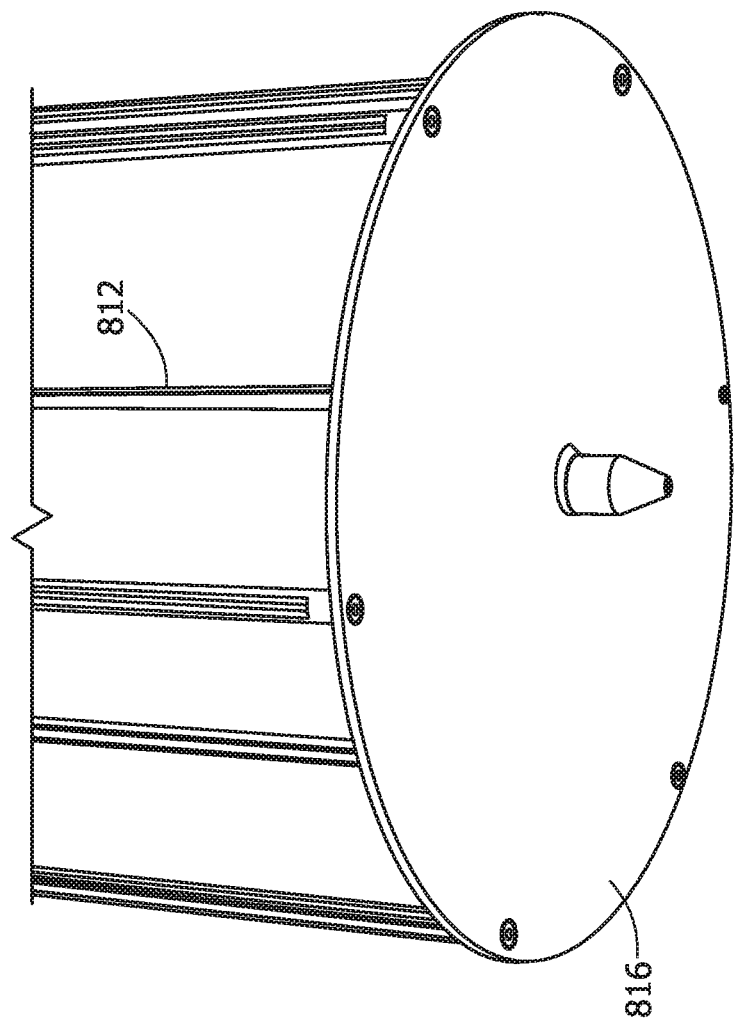
FIG. 19 is an enlarged perspective view of a lower axial portion of the assembly shown in FIG. 14 and FIG. 15.

Each image display surface 820 is operatively connected via appropriate connection means to a suitable image generating source (not shown), such as, for example, an LED driver or a server (not shown), whereupon a selection of segmented images can be transmitted to each image display surface 820. As seen in FIG. 17, the rotation motor 814, which is connected via a pair of power distribution wires 817 to a power source (not shown), includes a pair of slip rings 818. Each slip ring 818 is fixedly secured to an output shaft 822 of the rotation motor 814 and each slip ring 818 is operatively connected with a take-off connection 823. Accordingly, segmented images can be transmitted via the slip rings 818 to the image display surfaces 820 of the posts 812.

Figures 15, 16:
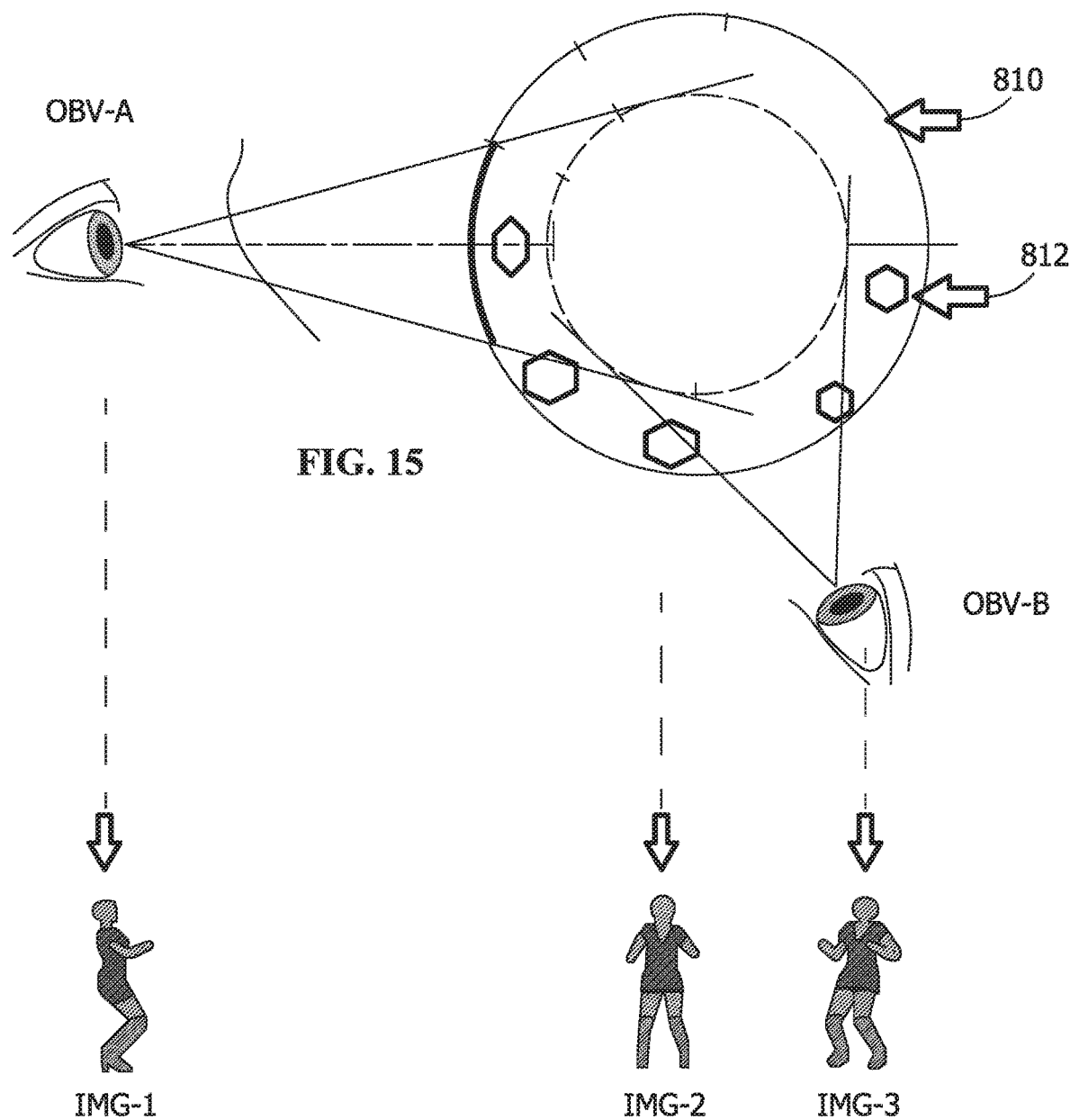
FIG. 15 is a top schematic plan view of the assembly of the embodiment shown in FIG. 14 and showing in a schematic manner the relative positions of a pair of audience members observing the assembly.
FIG. 16 is a schematic view of respective images observed by the audience members positioned, as described with respect to FIG. 15.

As seen in FIG. 15, the display arrangement 810 is configured such that the posts 812 are distributed angularly around a portion of the lower disc 816. A bottom axial end of each post 812 is fixedly secured to the lower disc 816 of the display arrangement 810 and a top axial end of the post is fixedly secured to the upper disc of the display arrangement 810. As images are displayed via each image display surface 820 during rotation of the display arrangement 810, the image display surfaces 820 of the posts 812 cyclically and continuously pass in front of the eyes of members of an audience viewing the display arrangement 810. The rotation of the display arrangement 810, while images are displayed via the image display surfaces 820 of the posts 812, is coordinated to achieve a visual effect whereby each audience member views these displayed images and integrates or processes the received images in a manner that leads the audience member to believe that he or she is viewing a visual representation of a tableau of objects or a single object or viewing an actual tableau of objects or an actual object. This visual representation is hereinafter referred to as a portrayal.

The rate of rotation of the display arrangement 810 may, for example, be in the range of 400-600 revolutions per minute (RPM). As seen in FIG. 15, a given audience member, denominated as an observer OBV-A, is seated on a left-hand side of a viewing area facing the display arrangement 810 and is able to view a portion of the display arrangement 810 as it is rotated. Likewise, another audience member, denominated as an observer OBV-B, is seated in a portion of the viewing area slightly to the right of center of the viewing area and is also able to observe the display arrangement 810 as it is rotated.

Via controlled movement and selection of images displayed by each image display surface 820 during the rotation of the display arrangement 810, the operation of the display arrangement 810 can be configured such that the observer OBV-A will observe the portrayal from a different vantage point than the observer OBV-B, who is also observing the portrayal during the same period of time. Moreover, the operation of the display arrangement 810 can be configured such that the observer OBV-A, the observer OBV-B, and other audience members viewing the display arrangement 810 will perceive that the portrayal that they are observing appears to have three-dimensional properties. The term "appears to have three-dimensional properties" is intended to refer to the characteristic that an audience member observing the portrayal, will, upon displacing himself or herself relative to the display arrangement 810, perceive that he or she is viewing the same portrayal, but viewing the portrayal as if the vantage point had changed in the same manner that a viewer would view an actual 3-D object and see it differently at different vantage points. For example, as seen in FIG. 16, the observer OBV-A can observe a side view of an image of an individual in a partially crouched position, shown as image IMG-1 in FIG. 16. On the other hand, the observer OBV-B observing the same three-dimensional image of the partially crouched individual, will observe the image of the individual in a different perspective and this perspective is shown as the image IMG-3 in FIG. 16. FIG. 16 also shows the image that would be seen by an audience member positioned in the center of the viewing area and thus in a position to have a frontal view of the image created by the display arrangement 810 and this frontal view of the image is seen as image IMG-2 in FIG. 16.

FIG. 20 shows an individual post 812 and FIG. 21 shows an enlarged cross-sectional view of the post 812 shown in FIG. 20 as taken along the section lines A-A. As seen in FIG. 21, each image display surface 820 extends vertically and is disposed angularly intermediate a view modifier 830 and an adjacent view modifier 830. The view modifiers 830 operate to block or deny viewing of a portion or the totality of the respective image display surface 820 disposed therebetween. Thus, it can be understood that, as the display arrangement 810 rotates, the view modifiers 830 continuously vary the portion of the respective image display surface 820 therebetween that can be seen by each individual audience member. Accordingly, by appropriate selection and control of the displays displayed by the image display surfaces 820, it is possible to generate a plurality of segmented images seen by each audience member. With appropriate selection of the rate of rotation of the display arrangement 810, the display of images on the image display surfaces 820, and control and selection of other factors, it is thus possible to create the illusion that a three-dimensional tableau of objects are disposed in the volume bounded by the display arrangement 810. Moreover, each audience member will, as a function of the position of the audience member relative to the display arrangement 810, view a respective front, side, or rear view of the portrayal created by the operation of the display arrangement 810.

The display arrangement 810, in one aspect thereof, provides a structure that displays images and the entirety of the respective portion of the structure that delimits the volume in which the portrayal appears to a viewer to be located is rotated. According to a further feature of this one aspect of the display arrangement 810, none of the display arrangement is located radially inwardly of the apparent displaced volume of the portrayal.

Figure 27:
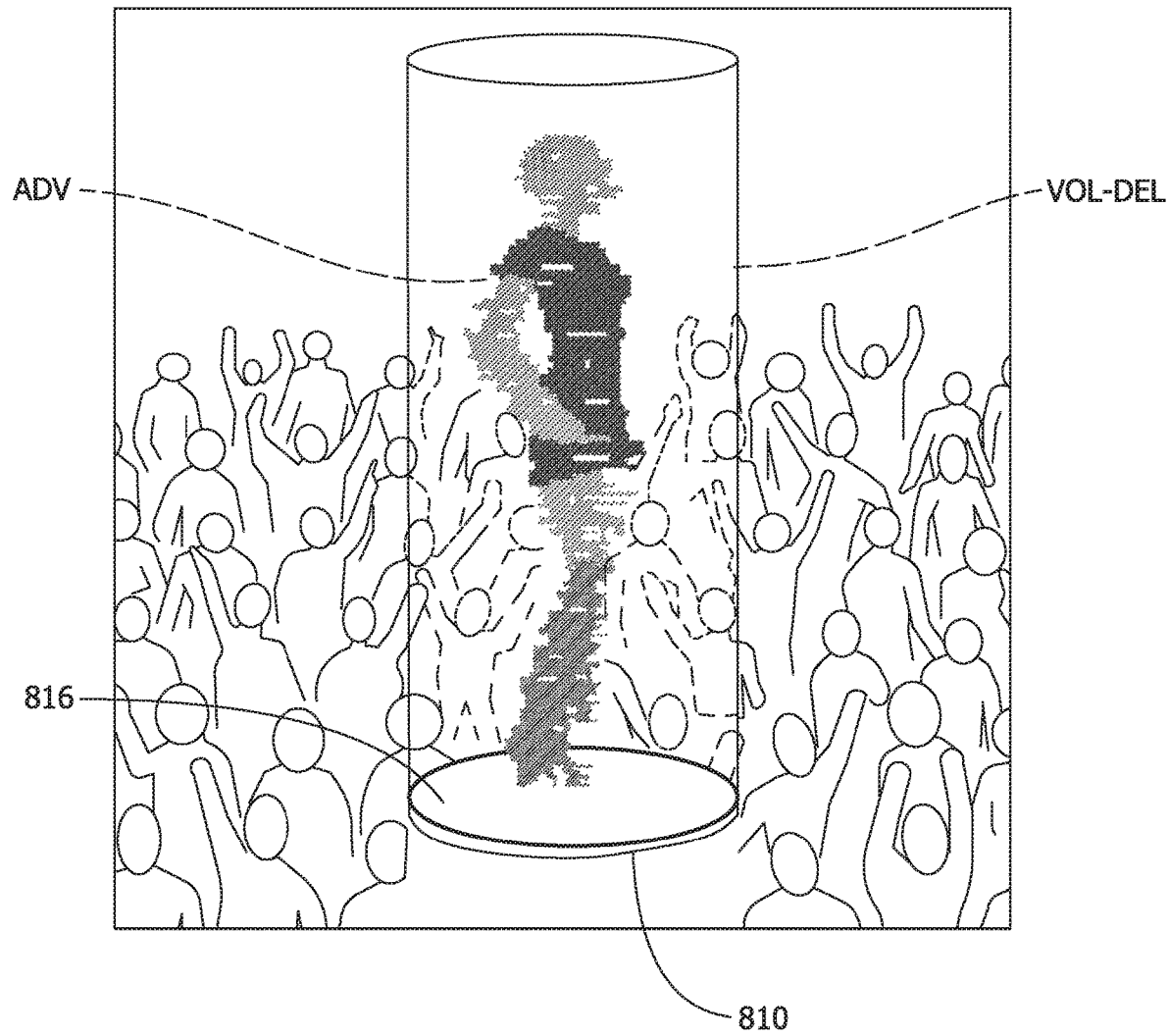
FIG. 27 is a schematic perspective view of a representation of a visual effect generated by the display arrangement.

FIG. 27 is a schematic perspective view of a representation of a visual effect generated by the display arrangement. The respective portion of the structure that delimits the volume in which the portrayal appears to a viewer to be located is denominated in FIG. 27 as the delimited volume VOL-DEL. The lower disc 816 of the display arrangement 810 delimits a lower axial end of the delimited volume VOL-DEL. The longitudinal axis of the display arrangement 810 about which the driven sub-assembly of the display arrangement is rotated is denominated in FIG. 27 as the longitudinal axis LONG-A. The apparent displaced volume of the portrayal is denominated in FIG. 27 as the apparent displaced volume ADV and this apparent displaced volume ADV is within the delimited volume VOL-DEL. It can be seen that none of the display arrangement 810 is located radially inwardly of the apparent displaced volume ADV of the portrayal.

Figure 18:
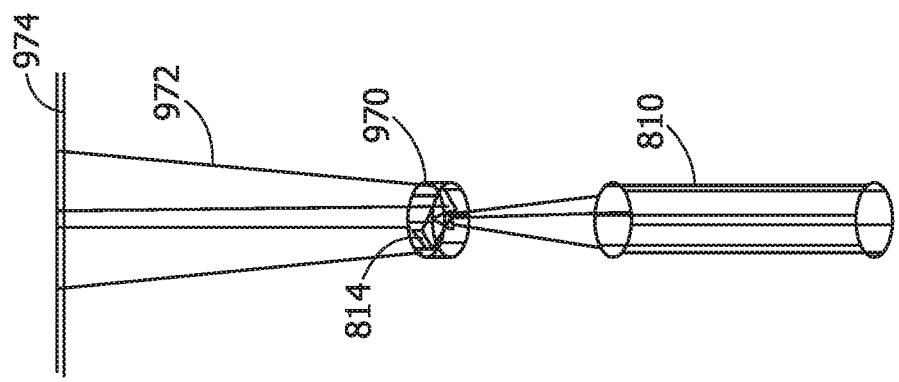
FIG. 18 is a top perspective view of a variation of the additional exemplary embodiment shown in FIG. 14.
Figure 22:
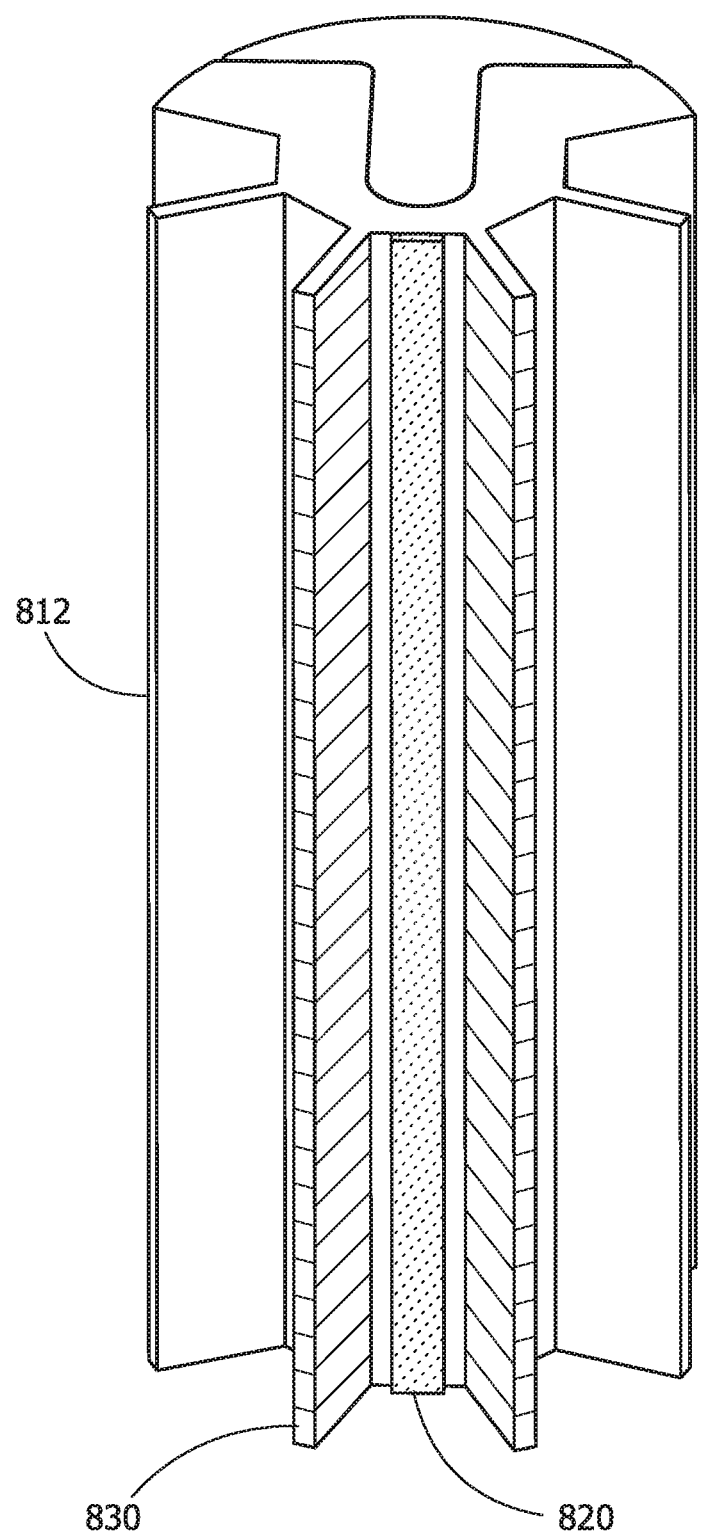
FIG. 22 is an enlarged schematic view of a pair of adjacent view modifiers and a respective video strip position angularly intermediate therebetween.

FIG. 18 shows a variation of the additional exemplary embodiment whereupon, in this variation, the rotation motor 814 is mounted in a stationary support 970 that is suspended via a plurality of cables 972 to a roof structure 974 of the building or arena. In this variation, the stationary support 970 does not move in a horizontal manner but, instead, remains suspended in a generally non-moving disposition below the roof structure 974 of the building. The rotation motor 814 rotates the driven sub-assembly of the display arrangement 810, which is suspended from the output shaft 822 of the rotation motor 814 via a plurality of cables connected to the output shaft.

With reference again to the additional exemplary embodiment shown in FIGS. 14-17 and 19-26, the lower disc 816 of the display arrangement 810 includes a tapered portion that is received in a compatibly configured conical portion 932 formed in the floor portion 930 of the building. Thus, as the display arrangement 810 is drivingly rotated by the rotation motor 814, the conical portion 932 of the floor portion 930 permits general free rotation of the display arrangement 810 while, at the same time, stabilizing the rotation movement of the display arrangement 810 due to the support and interaction between the conical surface of the conical portion 932 and the compatibly configured conical projection on the bottom of the lower disc 816 of the display arrangement 810.

Figure 23:
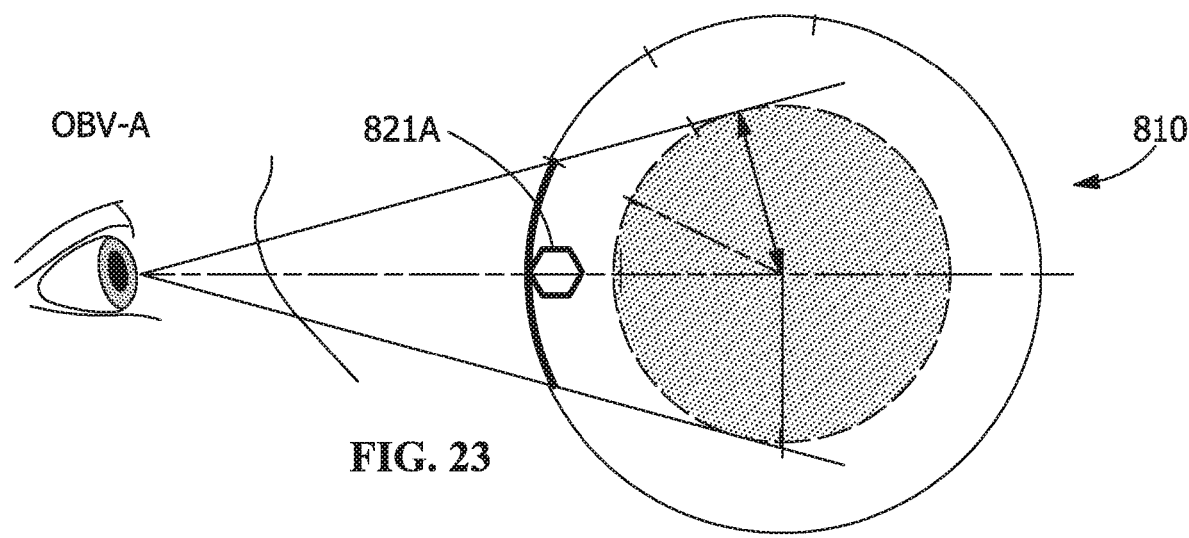
FIG. 23 is a top plan schematic view of the assembly of the additional exemplary embodiment shown in FIG. 14 and FIG. 15 and showing the assembly at an arbitrarily selected instant in time during a given revolution of the assembly.
Figure 24:
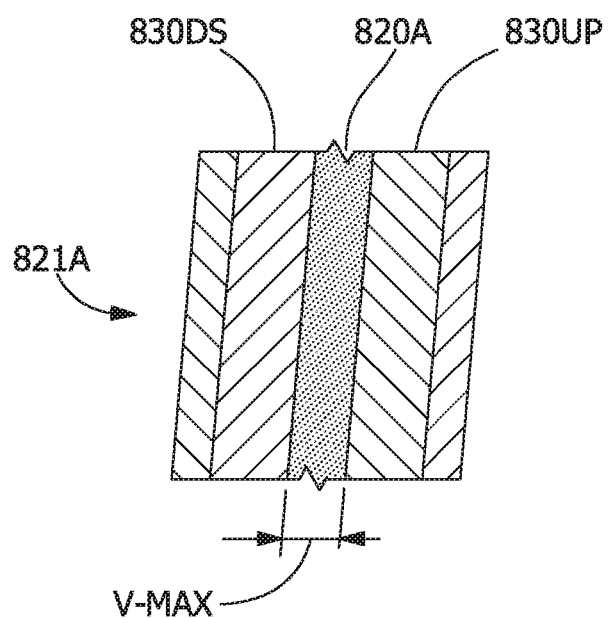
FIG. 24 is an enlarged front perspective view of a portion of the individual post shown in FIG. 23.

FIG. 23 is a top plan schematic view of the display arrangement 810 and showing the display arrangement 810 at an arbitrarily selected instant in time during a given revolution of the display arrangement 810 at which an individual post 821A is within the field of vision of the observer OBV-A such that the observer OBV-A can see images displayed on a respective image display surface 820 on the individual post 821A. This respective image display surface 820 on the individual post 821A is designated as the video strip of interest. FIG. 24 is an enlarged front perspective view of a portion of the individual post 821A shown in FIG. 23. At the arbitrarily selected instant in time during the revolution of the display arrangement 810 at which the observer OBV-A observes the video strip of interest, the orientation of the video strip of interest relative to the observer OBV-A is such that neither of the respective pair of the view modifiers 830 between which the video strip of interest is disposed—hereinafter designated as the downstream view modifier 830DS and the upstream view modifier 830UP—either partially or fully restrict the observer OBV-A's view of the video strip of interest. Accordingly, the observer OBV-A can view the maximum effective area of the video strip of interest and this maximum effective area of the video strip of interest is delimited by a length dimension parallel to the longitudinal axis of the video strip of interest and a width dimension perpendicular to the longitudinal axis of the video strip of interest and tangential to the path of revolution of the display arrangement 810. As seen in FIG. 23, the width dimension of the video strip of interest when the observer OBV-A can view the maximum effective area of the video strip of interest is designated as the maximum width dimension V-MAX.

Figure 25:
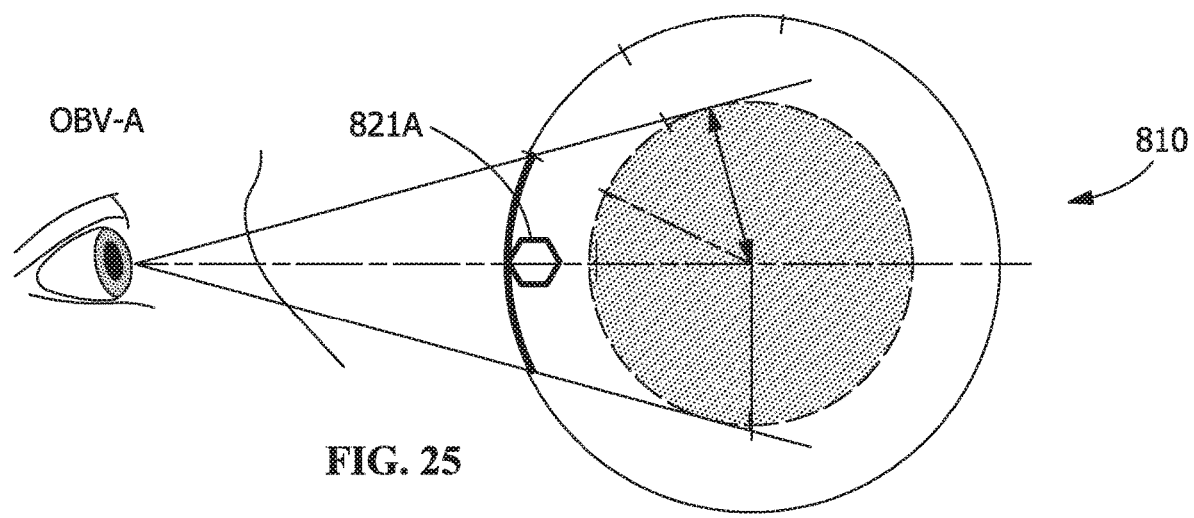
FIG. 25 is a top plan schematic view of the assembly of the additional exemplary embodiment shown in FIG. 14 and FIG. 15 and showing the assembly at an arbitrarily selected instant of time after the individual post has, on account of the rotation of the assembly, advanced relatively slightly along the path of revolution of the assembly from its position shown in FIG. 23 to a new position.
Figure 26:
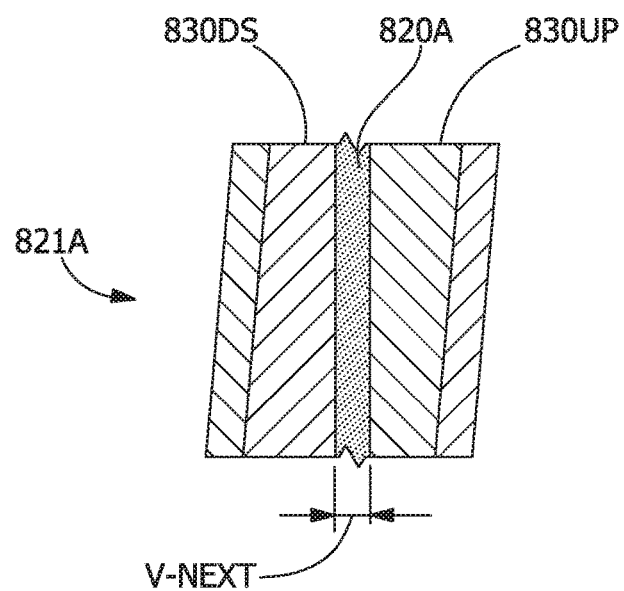
FIG. 26 is an enlarged front perspective view of a portion of the individual post shown in FIG. 25.

FIG. 25 is a top plan schematic view of the display arrangement 810 and shows the display arrangement 810 at an arbitrarily selected instant of time after the individual post 821A has, on account of the rotation of the display arrangement 810, advanced relatively slightly along the path of revolution of the display arrangement 810 from its position shown in FIG. 23 to a new position. FIG. 26 is an enlarged front perspective view of a portion of the individual post 821A shown in FIG. 25. As seen in FIG. 25, the video strip of interest is still in the field of view of the observer OBV-A. However, the overall effective area of the video strip of interest that is visible to the observer OBV-A is less than the overall effective area of the video strip of interest that had been visible to the observer OBV-A when the video strip of interest was in its position relative to the observer OBV-A shown in FIG. 23. This reduction in the overall effective area of the video strip of interest that is visible to the observer OBV-A is attributable to a reduction in the effective width of the video strip of interest that is visible to the observer OBV-A—namely, the effective width of the video strip of interest that is visible to the observer OBV-A viewing the video strip of interest in FIG. 25. This reduced effective width of the video strip of interest—designated in FIG. 26 as the effective width V-NEXT—is less than the maximum effective width V-MAX of the video strip of interest that is visible to the observer OBV-A viewing the video strip of interest in FIG. 23.

The angular movement of the video strip of interest from its position shown in FIG. 23 to its position shown in FIG. 25 brings into play the view restricting function of the respective view modifier 830 that bounds the video strip of interest on its downstream longitudinal side (as viewed relative to the rotation path of the video strip of interest)—namely, the downstream view modifier 830DS. This downstream view modifier 830DS increasingly intercepts the line of sight of the observer OBV-A relative to the video strip of interest and thus prevents the observer OBV-A from observing the respective images displayed on the video strip of interest. Upon further rotation of the display arrangement 810, this downstream view modifier 830DS eventually completely intercepts the line of sight of the observer OBV-A relative to the video strip of interest and thus fully prevents the observer OBV-A from observing the respective images displayed on the video strip of interest. To be sure, once the display arrangement 810 has completed an increment of rotation sufficient to again dispose the video strip of interest at the position shown in FIG. 23, the observer OBV-A can again view the maximum effective area of the video strip of interest.

Figure 29:
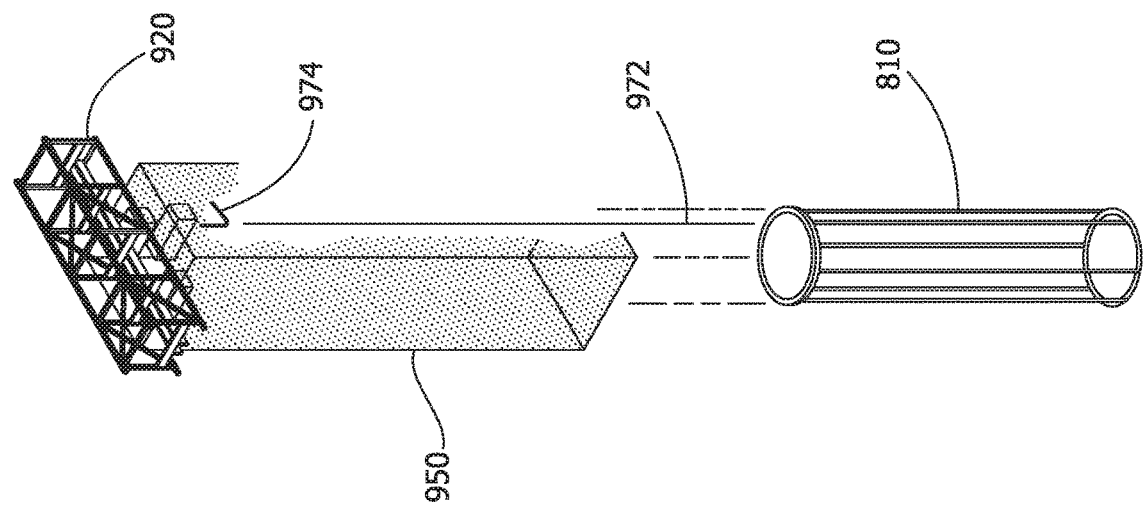
FIG. 29 is a top perspective view of the horizontal truss beam and showing the display arrangement shown in FIG. 28 but with the display arrangement in a lowered position.
Figure 28:
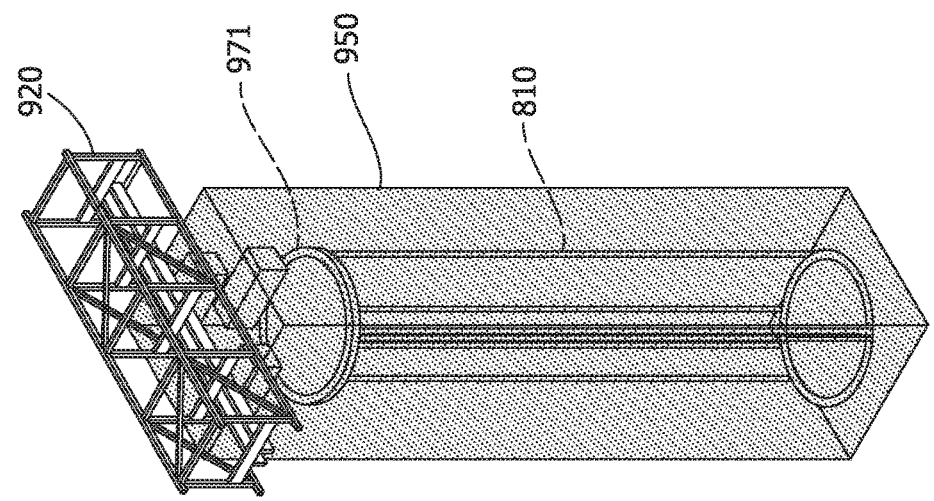
FIG. 28 is a top perspective view of the horizontal truss beam and showing the display arrangement configured as the further variation of the additional exemplary embodiment and in a raised position.

Reference is now made to FIGS. 28 and 29 in connection with a description of a further variation of the additional exemplary embodiment. As seen in FIG. 28, which is a top perspective view of the horizontal truss beam 920 and showing the display arrangement 810 configured as the further variation of the additional exemplary embodiment and in a raised position, the display arrangement 810 includes a total of six (6) posts 812 each having a lower axial end secured to a lower annulus ring and an upper axial end secured to a driven ring. The driven ring is in the shape of an annulus and is movably secured in a race of a linear arc motor assembly 971 such that the driven ring can be drivingly rotated about the longitudinal axis LONG-A of the display arrangement 810 via the linear arc motor assembly 971.

As seen in FIG. 29, which is a top perspective view of the horizontal truss beam 920 and showing the display arrangement 810 shown in FIG. 28 but with the display arrangement 810 in a lowered position, the linear arc motor assembly 971 is secured to lower ends of a plurality of cables 972. The upper ends of the cables 972 are secured to a winch assembly 974 secured to the horizontal truss beam 920 and the winch assembly 974 is operable to selectively raise and lower the linear arc motor assembly 971, the driven ring, the lower annulus ring, and the posts 812 via winding up and paying out of the cables 972 around drums of the winch assembly 974.

The linear arc motor assembly 971 includes a conventional linear arc motor that effects rotation of the driven ring via the generation of magnetic forces which repel or attract components of the motor to produce rotational movement. The linear arc motor assembly 971 is operable to drivingly rotate the posts 812 about the longitudinal axis LONG-A of the display arrangement 810 while the image display surfaces 820 on the posts 812 display images.

The display arrangement 810 includes a parallelepiped-shaped open enclosure 950 having an open lower end and this enclosure is compatibly dimensioned with respect to the sub-arrangement of the linear arc motor assembly 971, the driven ring, the lower annulus ring, and the posts 812 such that this sub-arrangement can be housed within the interior volume of the enclosure when the display arrangement 810 is in its raised position shown in FIG. 28 and can be lowered through the open lower end of the enclosure until it is fully beyond the interior volume of the enclosure and in its lowered position as shown in FIG. 29. The enclosure 950 may be optionally configured with a transparent material or otherwise permitting the transmission of light therethrough.

The display arrangement 810 as configured as the further variation shown in FIGS. 28 and 29 operates with the driven ring, the lower annulus ring, and the posts 812 being drivingly rotated via the linear arc motor assembly 971 while the sub-arrangement of the linear arc motor assembly 971, the driven ring, the lower annulus ring, and the posts 812 are suspended above a floor or other building structure via the cables 972. In this connection, the lower end of the sub-arrangement is not in contact with the floor or other building structure therebeneath.

The additional exemplary embodiment thus provides an arrangement for creating a visual effect, the arrangement comprising a rotatable element, a plurality of view-restricting elements, the view-restricting elements being commonly mounted in an angular manner on the rotatable element at angular spacings from one another, and a plurality of image display surfaces each disposed between a respective pair of view restricting elements, the image displaying portions being commonly mounted in an angular manner on the rotatable element. Via appropriate control of the rotation of the rotatable element and appropriate control of the images displayed via the image-displaying elements, an observer of the assembly perceives that a three-dimensional image is being viewed. In some instances, this visual effect may be facilitated by a phenomena known as the persistence of motion phenomena.

Provided is a three-dimensional display device, a system for creating a three-dimensional display, and a process of creating a three-dimensional display. Embodiments of the present disclosure create an illusion of a three-dimensional image, create an illusion of three-dimensional movement of an object, permit moving images to be displayed in three dimensions, reduce or eliminate segmentation of three-dimensional images, reduce or eliminate jerkiness, utilize simpler lighting systems and/or fewer pixels, rely upon low amounts of data in comparison to prior three-dimensional image display techniques, reduce or eliminate manipulation and/or conversion of data in comparison to prior three-dimensional image display techniques, permit viewing of three-dimensional images from multiple and/or all directions, or combinations thereof.

Figure 1:
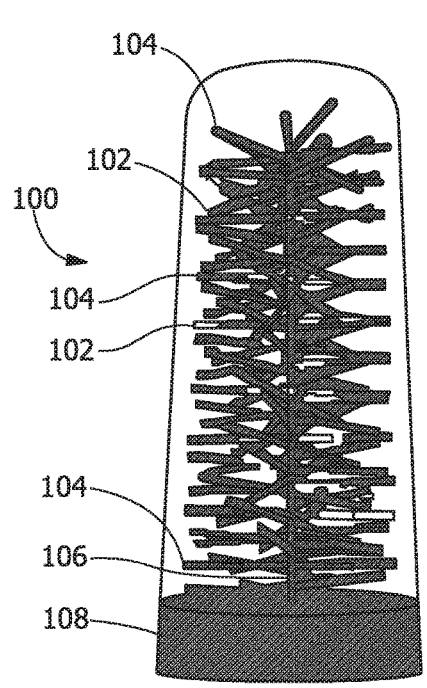
FIG. 1 is a perspective view of an exemplary three-dimensional display device, according to the disclosure.

Referring to FIG. 1, a three-dimensional display device 100 is shown. The three-dimensional display device 100 includes an arrangement of light-emitting elements 102, such as video strips, light-emitting diodes, organic light-emitting diodes, fiber-optic lights, fluorescent lights, incandescent lights, neon lights, or combinations thereof. In one embodiment, each of the light-emitting elements 102 includes a predetermined number of pixels per inch, for example, between 1 and 100, between 1 and 10, between 1 and 20, between 10 and 20, between 5 and 10, between 3 and 8, between 10 and 50, between 10 and 30, between 30 and 50, between 20 and 40, between 1 and 5, or any suitable combination or sub-combination thereof. The arrangement of pixels is substantially uniform or non-uniform along the light-emitting elements 102. In one embodiment, the density of pixels is greater at portions of the light-emitting element 102 that are to rotate at a higher rate during rotation of the three-dimensional display device 100 (for example portions farthest from a central location of the three-dimensional display device 100).

The light-emitting elements 102 are powered from a local power source, such as a battery, and/or are powered by an external power source, for example, positioned in a non-moving portion 108 of the three-dimensional display device 100 but in electrical communication with the light-emitting elements 102. Likewise, the light-emitting elements 102 are controlled by a local controller and/or are controlled by an external controller, for example, positioned in the non-moving portion 108 of the three-dimensional display device 100 but in communication with the light-emitting elements 102.

Figure 7:
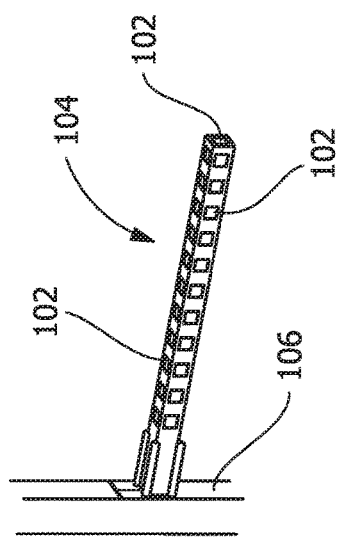
FIG. 7 is a perspective view of an exemplary protruding member of a three-dimensional display device rotating, according to the disclosure.

The light-emitting elements 102 are a single unitary construction capable of providing a range of colored light and/or a range of intensity of light or a combined construction capable of providing the range of colored light and/or the range of intensity of light. In one embodiment, the light-emitting elements 102 are devoid of any additional structural components other than the light-emitting elements 102 and also serve as a structural member, such as, a protruding member 104. In another embodiment, as shown in FIG. 7, the light-emitting elements 102 are positioned along the protruding member 104 providing structural support and/or resilience. In a further embodiment, a plurality of the light-emitting elements 102 are positioned on the protruding member 104, for example, with the protruding member 104 having a cuboid geometry and the light-emitting elements 102 being positioned on various surfaces of the protruding member 104. In one embodiment, the light-emitting elements 102 are positioned on opposite surfaces of the protruding members 104. In one embodiment, the light-emitting elements 102 and/or protruding members 104 are of different lengths (see FIG. 11).

Figure 11:
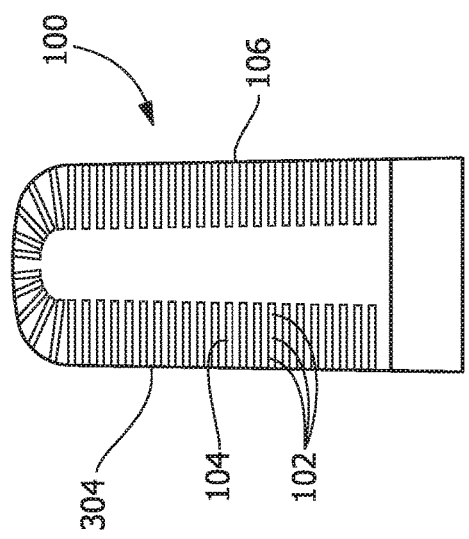
FIG. 11 is a perspective view of an exemplary three-dimensional display device, according to the disclosure.

The light-emitting elements 102 extend from a central location, such as along a rotatable portion 106, for example, an elongate member, capable of rotation at high velocities (for example, velocities capable of creating an illusion of a continuous image by rotation of the light-emitting elements 102) as is shown in FIGS. 1-4 and 8-10 or inward from the rotatable portion, for example, a rotatable cover 304, as is shown in FIG. 11. In one embodiment, the non-moving portion 108 includes suitable devices configured to provide rotation to rotatable portion 106 or rotatable cover 304, such as motors or gears, for example. Referring to FIGS. 1-4 and 8-11, in some embodiments, the light-emitting elements 102 are fixedly secured to the rotatable portion 106 and extend in a rigid manner from the rotatable portion 106, for example, by fasteners, such as a clipping mechanism, a threaded feature, a welding, soldering, bolts, adhesives, interference fits, or other suitable engagement mechanisms. For example, FIG. 11 shows an embodiment with the rotatable portion 106 being the cover 304 and the light-emitting elements 102 and/or protruding members 104 extending inward from the cover 304 in a rigid manner.

Referring to FIGS. 1-4 and 8-10, in other embodiments, the light-emitting elements 102 are flexibly secured to the rotatable portion 106. In these embodiments, when the rotatable portion 106 is not rotating, all or a portion of one or more of the light-emitting elements 102 hang in a downward direction, for example, toward or away from the non-moving portion 108, depending upon gravity and the orientation of the non-moving portion 108 in relation to the rotatable portion 106. As the rotatable portion 106 rotates, the light-emitting elements 102 begin to rotate and extend from the rotatable portion 106, for example, perpendicular to the rotatable portion 106 and/or gravity, or to a display position at any suitable angle relative to same, or a combination thereof. In one embodiment, the fasteners 110 are configured for any suitable rotatable connection to the rotatable portion 106, such as a ball joint, for example. During rotation of the rotatable portion 106, the hanging light-emitting elements 102 or the hanging protruding members 104 pivot swing upward into the display position during rotation of rotatable portion 106.

Figure 2:
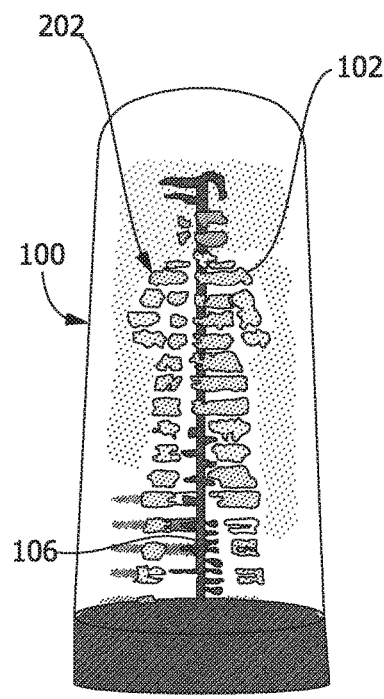
FIG. 2 is a perspective view of an exemplary three-dimensional display device rotating.

Referring to FIG. 2, upon rotation of the rotatable portion 106, the light-emitting elements 102 form a segmented image 202. The segmented image 202 includes regions where portions of an image are visible and regions where no image is visible. The position and size of these regions depends upon the size of the rotatable portion 106, the size of the protruding members 104, the amount of the protruding members 104 included, the size and position of the light-emitting elements 102, the brightness and color of the light-emitting elements 102, and other features and properties affecting the formation of the segmented image 202.

Figure 13:
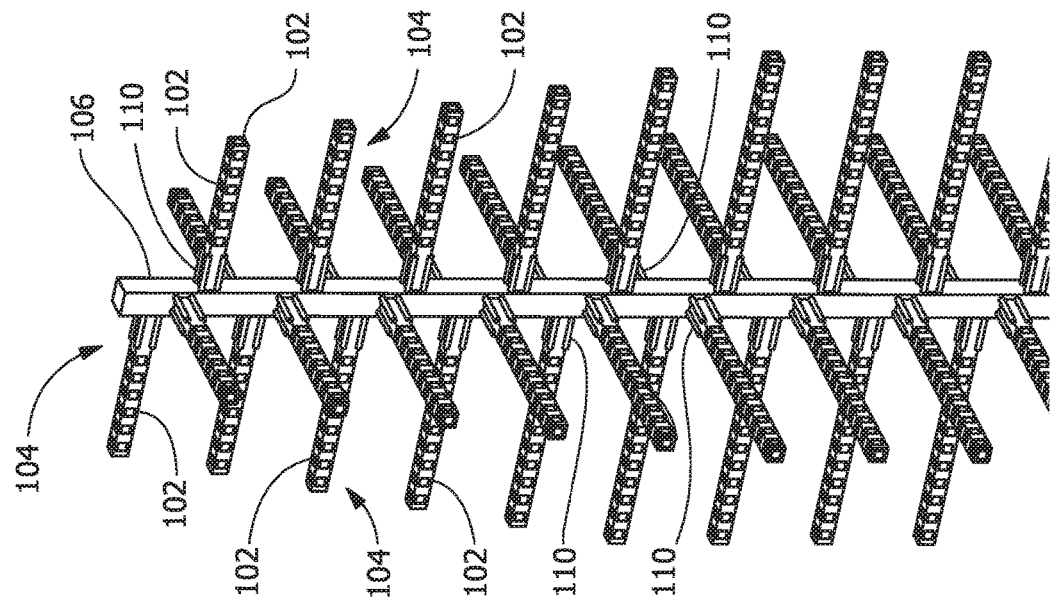
FIG. 13 is a partial perspective view of an exemplary three-dimensional display device, according to the disclosure.
Figure 12:
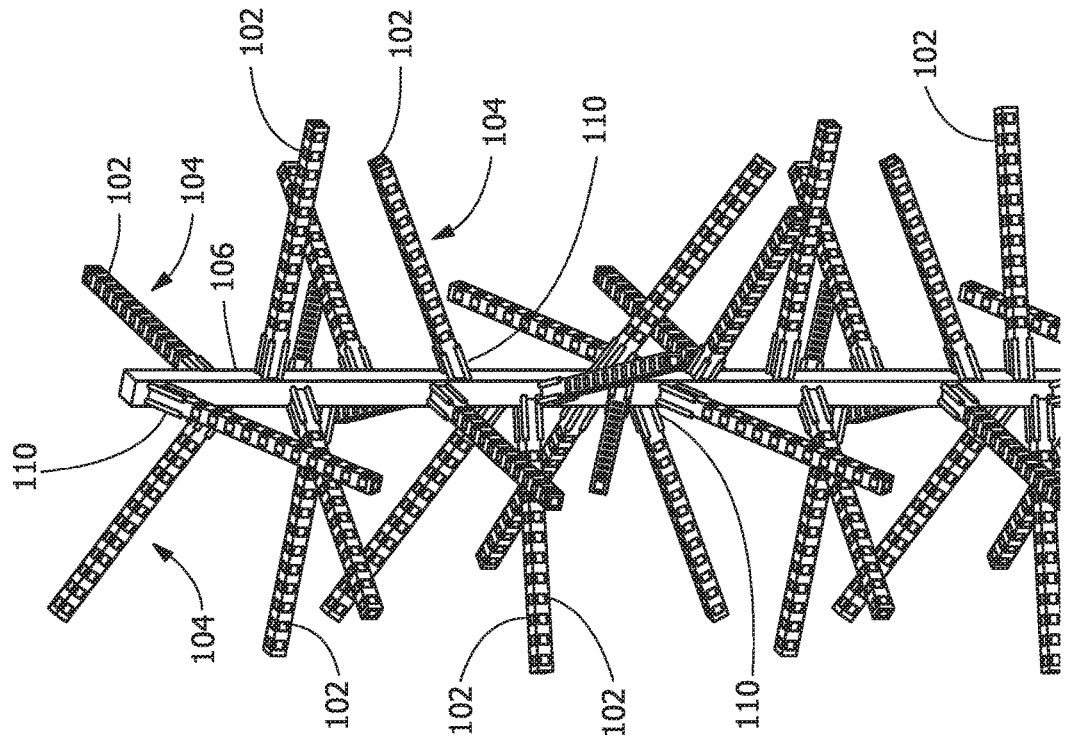
FIG. 12 is a partial perspective view of an exemplary three-dimensional display device, according to the disclosure.

In one embodiment, the protruding members 104 are arranged in a substantially uniform orientation around the rotatable portion 106 (see FIGS. 8, 9 and 13) in a predetermined pattern including three or more position parameters, such as equally spaced distribution vertically, equally spaced or equal polar angle horizontal distribution, and equal connection or display angle relative to the central vertical axis of the rotatable portion 106. Referring to FIG. 13, in one embodiment, each of the protruding members 104 are equally spaced in vertical distribution relative to the adjacent member, are at equal polar angle distribution relative to the adjacent member (about 90 degrees), and are positioned at the same display angle relative to the central vertical axis of the rotatable portion 106 (about 90 degrees). In one embodiment, the protruding members 104 are arranged in a non-uniform arrangement (see FIGS. 1 and 12). In a non-uniform arrangement embodiment, any one of the three position parameters can vary, such as vertical spacing, horizontal spacing or polar angle, or display angle relative to the central vertical axis of the rotatable portion 106, or a combination thereof. Referring to FIG. 12, in one embodiment, all three position parameters are varied, to provide varying relative positions of the protruding members 104. In one embodiment, one or more of the protruding members 104 are either flexibly, rigidly, or a combination of flexibly and rigidly secured. In one embodiment, the protrusions are arranged in a staggered orientation permitting viewing of light from the light-emitting elements 102 that would otherwise be obstructed.

The protruding members 104 extend at any suitable angle or angles from the rotatable portion 106. Suitable angles include, but are not limited to, 0 degrees (for example, perpendicular to the rotatable portion 106), 5 degrees upward (opposite the direction of gravity), 10 degrees upward, 20 degrees upward, 30 degrees upward, 5 degrees downward (along the direction of gravity), 10 degrees downward, 20 degrees downward, 30 degrees downward, or any range within. In one embodiment, all of the protruding members 104 extend at substantially the same angle from the rotatable portion 106. In another embodiment, some (but not all) of the protruding members 104 extend at substantially the same angle from the rotatable portion 106. In another embodiment, each of the protruding members 104 extends at a different angle from the rotatable portion 106. In one embodiment, the amount of the protruding members 104 included and the angle of each of the protruding members 104 is determined based upon the features of the rotatable portion 106, the light-emitting elements 102 utilized, and rates and quantity of data transmitted to the three-dimensional display device 100 for a display to be shown.

Figure 3:
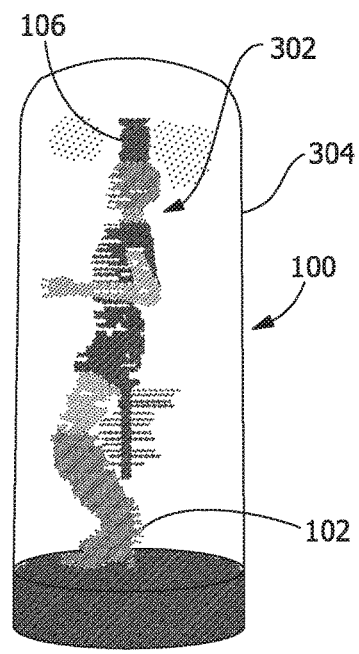
FIG. 3 is a perspective view of an exemplary three-dimensional display device rotating according to an exemplary process of creating a three-dimensional display, according to the disclosure.

The segmented image 202 appears segmented until the rotation of the rotatable portion 106 exceeds a predetermined rate, as is shown in FIG. 3, and an illusion of a complete three-dimensional image 302 is formed. The predetermined rate is specific to the three-dimensional display device 100 and arrangement and/or structure of the rotatable portions 106 in the three-dimensional display device 100. For example, the predetermined rate corresponds to one or more of the size of the rotatable portion 106, the amount of the rotatable portions 106 included, the size and position of the light-emitting elements 102, the brightness and color of the light-emitting elements 102, features of the three-dimensional image 302 formed (such as, brightness, geometry, complexity, dimensions, colors, and combinations thereof), environmental factors (such as, brightness, shadowing, temperature, wind, precipitation, such as rain or snow, external lighting, or combinations thereof), or other suitable features or conditions.

Figure 4:
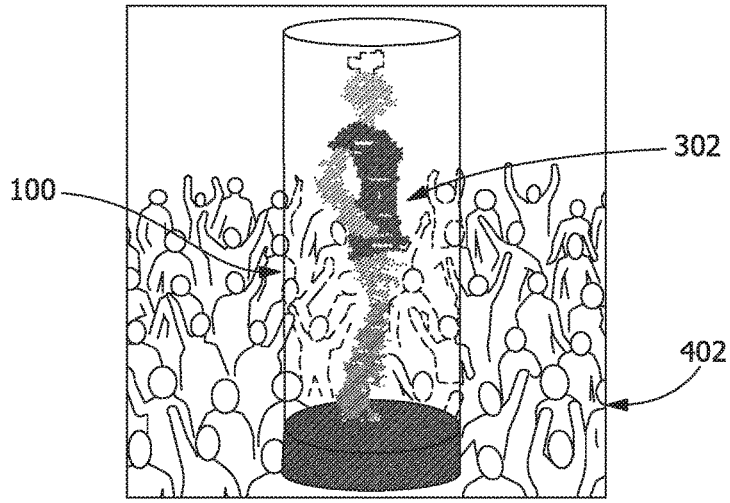
FIG. 4 is a perspective view of an exemplary three-dimensional display device rotating according to an exemplary process of creating a three-dimensional display, according to the disclosure.

As shown in FIG. 4, the three-dimensional image 302 is capable of being viewed from any direction, for example, by an audience 402 positioned around the three-dimensional image 302 at a concert. In one embodiment, the three-dimensional image 302 is capable of being viewed from around the three-dimensional image 302, above the three-dimensional image 302, at an angle above or below the three-dimensional image 302, or combinations thereof. The viewing is capable of being directed to a specific region or all directions. In one embodiment, as is further described below with reference to FIG. 6, the viewing corresponds to orientation of visual detectors 604, such as cameras, arranged in an array 606 (for example, a concentric array) around an object 602 that is reproduced as the three-dimensional image.

Figure 8:
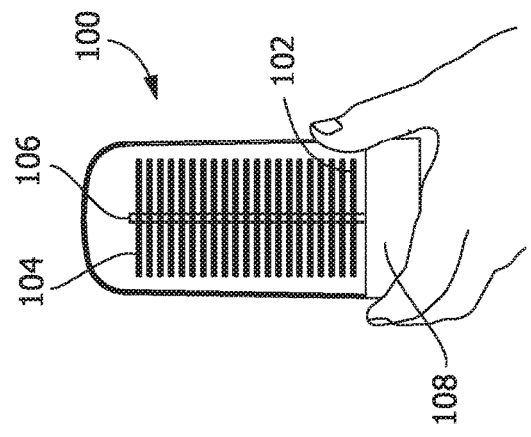
FIG. 8 is a perspective view of an exemplary three-dimensional display device, according to the disclosure.
Figure 9:
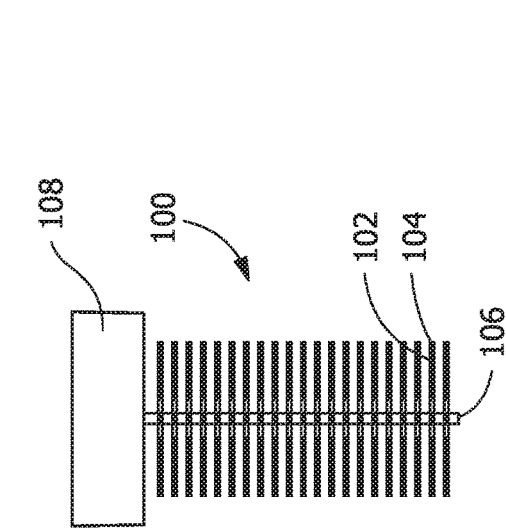
FIG. 9 is a perspective view of an exemplary three-dimensional display device, according to the disclosure.

Referring again to FIG. 3, in one embodiment, the three-dimensional display device 100 includes the cover 304 for preventing interruption of rotation. In embodiments used in a concert, stadium, theatrical, or commercial displays, this permits operation closer to individuals that may otherwise interrupt display of the three-dimensional image 302. In one embodiment, the three-dimensional image 302 is larger than a life-sized display of a human. In this embodiment, the three-dimensional display device 100 is capable of being used in any event (such as a concert, sporting event, theatrical event, ornamental display, advertisement, holiday/Christmas light displays, or lecture event) for additional viewing enjoyment, to remedy obstructed viewing at any events, to further facilitate communication, or any other suitable enhancement of viewing. In one embodiment, the three-dimensional display device 100 is totally contained and unable to be accessed by unauthorized individuals. In this embodiment, the three-dimensional display device 100 is capable of being operated remotely or on a continuous loop. For example, in one embodiment, the three-dimensional image 302 is a life-sized display of a human. In this embodiment, the three-dimensional display device 100 is capable of being used as an advertising display, a virtual receptionist, a virtual bank teller, an interactive computer-operated display, a virtual teacher, or any other suitable virtual being or object. In one embodiment, the three-dimensional image 302 is smaller than a life-sized display of a human. For example, in a further embodiment, as shown in FIG. 8, the three-dimensional display device 100 is a hand-held device capable of individual viewing. In this embodiment, the three-dimensional display device 100 is capable of being used as a communication tool, a teaching tool, a novelty item, or any other suitable portable device. In a further embodiment, features for such portability are included, such as, collapsibility of the rotatable portion 106, the light-emitting elements 102, the protruding members 104, or combinations thereof. For example, in one embodiment, the light-emitting elements 102 and the protruding members 104 are flexible or jointed, and the rotatable portion 106 collapses to within the non-moving portion 108 of the three-dimensional display device 100 when not operating. In another embodiment, the rotatable portion 106 is flexible or jointed, and capable of being positioned within the non-moving portion 108 of the three-dimensional display device 100. In this embodiment, as shown in FIG. 9, the three-dimensional display device 100 is operated with the rotatable portion 106 extending downward (in the direction of gravity) from the non-moving portion 108. Referring again to FIG. 7, in one embodiment, the rotatable portion 106 includes a square cross-section, but in alternative embodiments, the cross-section can be any suitable geometric shape such as circular, rectangular, oval, or combinations thereof.

Figure 5:
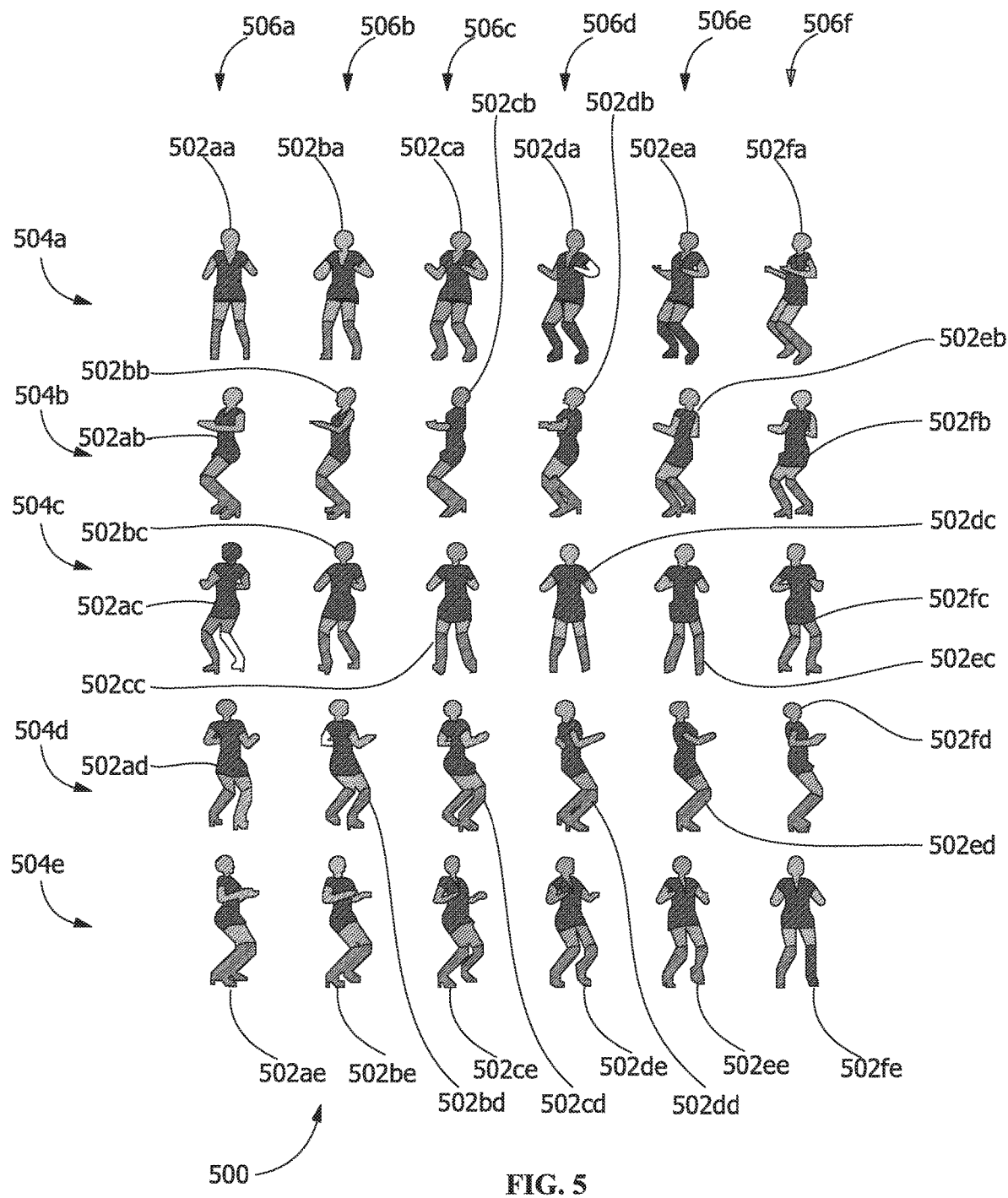
FIG. 5 is a schematic view of a segmented display of a three-dimensional object captured by an exemplary system for creating three-dimensional display, according to the disclosure.

Referring to FIG. 5, in one embodiment, the three-dimensional image 302 (see FIG. 3) is formed from a sequence 500 of segmented images 502 corresponding with segmented image data. The amount of the segmented images 502 used is any suitable number. Use of a greater amount of images desirably increases results in a more accurate depiction of the three-dimensional image 302 but utilizes more memory and/or requires a higher data transmission rate because it involves more data. Use of a lesser amount of images distorts the form of the three-dimensional image 302 but desirably uses less memory and/or utilizes a lower data transmission rate because it involves less data. The amount of segmented images 502 corresponds with an amount of the visual detectors 604 (see FIG. 6) used to capture image data or differs from the amount of the visual detectors 604 used to capture image data. Suitable amounts of segmented images 502 include, but are not limited to, three segmented images 502, four segmented images 502, eight segmented images 502, twelve segmented images 502, fifteen segmented images 502, twenty segmented images 502, twenty-four segmented images 502, thirty segmented images 502 (as is shown in FIG. 5), thirty-two segmented images 502, thirty-six segmented images 502, forty eight segmented images 502, or more segmented images 502. In one embodiment, data corresponding to the segmented images 502 is transmitted to the three-dimensional display device 100 and the three-dimensional image 302 is displayed without manipulation of the data and/or display of images corresponding to the data.

Figure 6:
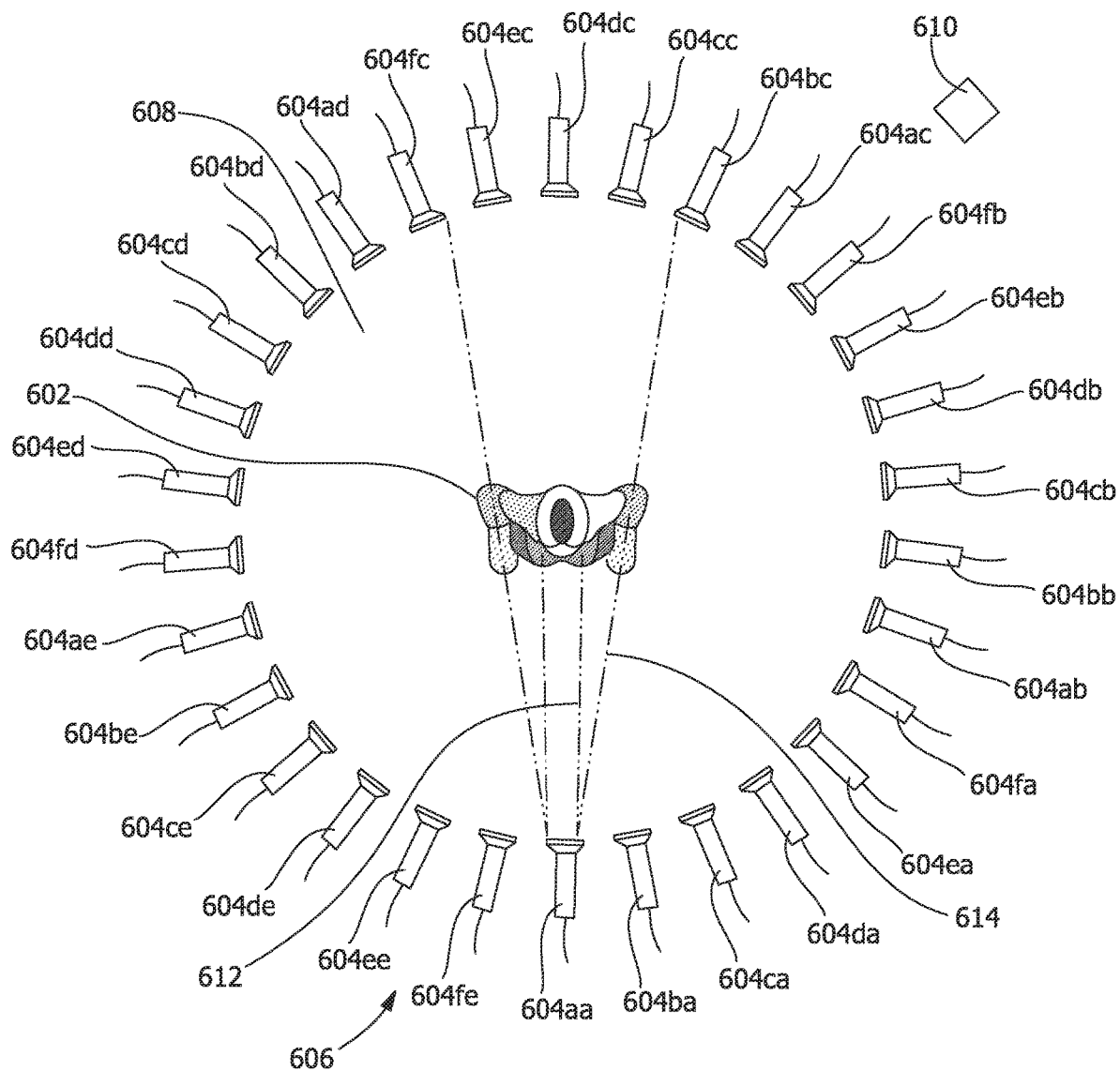
FIG. 6 is a top view of image data of a three-dimensional object being captured by an exemplary system for creating three-dimensional display, according to the disclosure.

In one embodiment, the segmented images 502 are arranged and/or displayed corresponding to a position relative to the object 602 (as shown in FIG. 6) that is to be displayed as the three-dimensional image 302 (as shown in FIG. 3). For example, as shown in FIG. 5, in one embodiment, the sequence 500 includes rows 504 and columns 506 permitting identification of specific portions of the sequence 500. In one embodiment, the rows 504 and/or columns 506 are identified numerically to facilitate operational communication of the three-dimensional display device 100. For example, in one embodiment, the rows 504 are identified by a first row 504a, a second row 504b, a third row 504c, a fourth row 504d, and a fifth row 504e and/or the columns 506 are identified by a first column 506a, a second column 506b, a third column 506c, a fourth column 506d, a fifth column 506e, a sixth column 506f, or any other suitable nomenclature. Identification of each of the rows 504 and the columns 506 permits identification of each of the segmented images 502 through a binomial (for example, segmented image 502aa, 502ab, 502ac, 502ad, 502ae, 502af, 502ba, 502bb, 502bc, 502bd, 502be, 502bf, 502ca, 502cb, 502cc, 502cd, 502ce, 502cf, 502da, 502db, 502dc, 502dd, 502de, 502df, 502ea, 502eb, 502ec, 502ed, 502ee, and 502ef).

Referring to FIG. 6, in one embodiment, the sequence 500 of the segmented images 502, described above with reference to FIG. 5, corresponds to the visual detectors 604, such as cameras, in the array 606 (for example, a concentric array) around the object 602, such as a performer. In one embodiment, each of the visual detectors 604, is mapped to correspond to each of the segmented images 502 with a corresponding binomial (for example, visual detector 604aa, 604ab, 604ac, 604ad, 604ae, 604af, 604ba, 604bb, 604bc, 604bd, 604be, 604bf, 604ca, 604cb, 604cc, 604cd, 604ce, 604cf, 604da, 604db, 604dc, 604dd, 604de, 604df, 604ea, 604eb, 604ec, 604ed, 604ee, and 604ef). The visual detectors 604 are any suitable device for capturing images or data associated with images. Suitable visual detectors 604 include, but are not limited to, color cameras, grayscale cameras, infrared cameras, motion detectors, light measuring devices, temperature measuring devices, three-dimensional cameras, two-dimensional cameras, any suitable spectroscopic device, or combinations thereof. In one embodiment, one or more of the visual detectors 604 are replaced with one or more mirrors or other reflective surfaces.

In one embodiment, the array 606 is arranged with the visual detectors 604 being positioned in a single plane. In this embodiment, the segmented images 502 generated are capable of being automatically aligned and transmitted as data to the three-dimensional display device 100 where the three-dimensional image 302 is displayed through illumination, colored illumination, and/or color transition of the light-emitting elements 102 in the protruding members 104. In another embodiment, the array 606 includes one or more of the visual detectors 604 being outside of the plane of one or more of the visual detectors 604. In this embodiment, the alignment of the segmented images 502 is correlated (for example, based upon previous calculations) and a more vivid display of the three-dimensional image 302 is generated. In one embodiment, the array 606 includes the visual detectors 604 aligned in more than one plane (or at least one of the visual detectors 604 is not positioned in a single plane), thereby creating additional visual lines for individuals viewing the object 602.

The visual detectors 604 within the array 606 are arranged at one or more predetermined angles with respect to a surface, such as a stage 608 (see FIG. 6). For example, in one embodiment, all of the visual detectors 604 are at the same angle with respect to the surface, some of the visual detectors 604 are at the same angle with respect to the surface, or each of the visual detectors 604 is at a different angle with respect to the surface. Suitable angles include, but are not limited to, 0 degrees (for example, parallel to the stage 608), 10 degrees (for example, aiming from an edge of the stage 608), 20 degrees, 30 degrees, 45 degrees, 60 degrees, or any range within.

The visual detectors 604 within the array 606 are arranged at one or more elevations in comparison to the surface (for example, a distance between the stage 608 and the visual detector 604). For example, in one embodiment, all of the visual detectors 604 are at the same elevation with respect to the surface, some of the visual detectors 604 are at the same elevation with respect to the surface, or each of the visual detectors 604 is at a different elevation with respect to the surface. Suitable elevations are relative or quantified. For example, in one embodiment, one or more of the visual detectors 604 is positioned below the surface (for example, angled up from beyond the surface, such as the stage 608), at zero elevation (for example, from the surface, such as the stage 608), at about one-third the height of the object 602 relative to the surface, at about one-half the height of the object relative to the surface, at about two-thirds the height of the object 602 relative to the surface, at about the height of the object 602, above the height of the object 602, or combinations thereof.

Adjustment of the position and orientation of the visual detectors 604 with respect to the surface and/or the object 602 permits a more complete representation of the object 602 to be displayed in the three-dimensional image 302. In addition, the position and orientation of the visual detectors 604 permits data of the segmented images 502 to be displayed by the three-dimensional display device 100 without data manipulation, such as interpolation, morphing, and/or dissolving. In one embodiment, the three-dimensional display device 100 is capable of displaying the three-dimensional image 302 in real-time or substantially real-time from a live feed, for example, with little or no manipulation of image data. In another embodiment, the three-dimensional display device 100 is capable of displaying the three-dimensional image 302 that is provided as a result of playback of pre-recorded image data, for example, with little or no manipulation of the image data.

In one embodiment, the visual detectors 604 are arranged with one or more theatrical devices 610 capable of modifying the view of the object 602. For example, in one embodiment, one or more of the theatrical devices 610 is a strobe light, a smoke machine, a laser, a light, or any suitable combination thereof. Use of the theatrical devices 610 permits additional effects to be shown in the display of the three-dimensional image 302. In one embodiment, the strobe light is at a rate corresponding to an image capture rate for the visual detectors 604 and/or an image display rate of the light-emitting elements 102 and/or the three-dimensional display device 100. Suitable image capture rates include, but are not limited to, about 3 frames per second, about 8 frames per second, about 15 frames per second, about 20 frames per second, about 24 frames per second, about 30 frames per second, about 60 frames per second, about 100 frames per second, about 600 frames per second, about 1000 frames per second, or any suitable sub-range within. Suitable image display rates are slower than, quicker than, or equal to the image capture rates. Suitable image display rates include, but are not limited to, about 3 frames per second, about 8 frames per second, about 15 frames per second, about 20 frames per second, about 24 frames per second, about 30 frames per second, about 60 frames per second, about 100 frames per second, about 600 frames per second, about 900 frames per second, about 1000 frames per second, or any suitable sub-range within. In one embodiment, the three-dimensional display device 100 rotates at a revolution rate corresponding to the image capture rate and/or the image display rate, for example, at about one-half of the image capture rate and/or the image display rate, one-third of the image capture rate and/or the image display rate, two-thirds of the image capture rate and/or the image display rate, or any other suitable ratio.

Referring again to FIG. 6, image data is captured corresponding to the object 602 to be displayed as the three-dimensional image 302 (see FIG. 3). The captured image data is capable of being viewed (for example, during or after the capturing to monitor quality) or is not capable of being viewed (for example, being transmitted without any viewing option). The captured image data includes segmented data corresponding to each of the visual detectors 604. In one embodiment, the segmented data is truncated such that the segmented data represents a rectangular data column (for example, corresponding to a rectangular region 612 in front of the visual detector 604 as is shown in FIG. 6) having peripheral data (not shown) eliminated (for example, corresponding to a peripheral region 614 angling from the visual detector 604 as is shown in FIG. 6). In one embodiment, the segmented data of the captured image data is correlated to position information about the object 602, such as, distance from one or more of the visual detectors 604.

Figure 10:
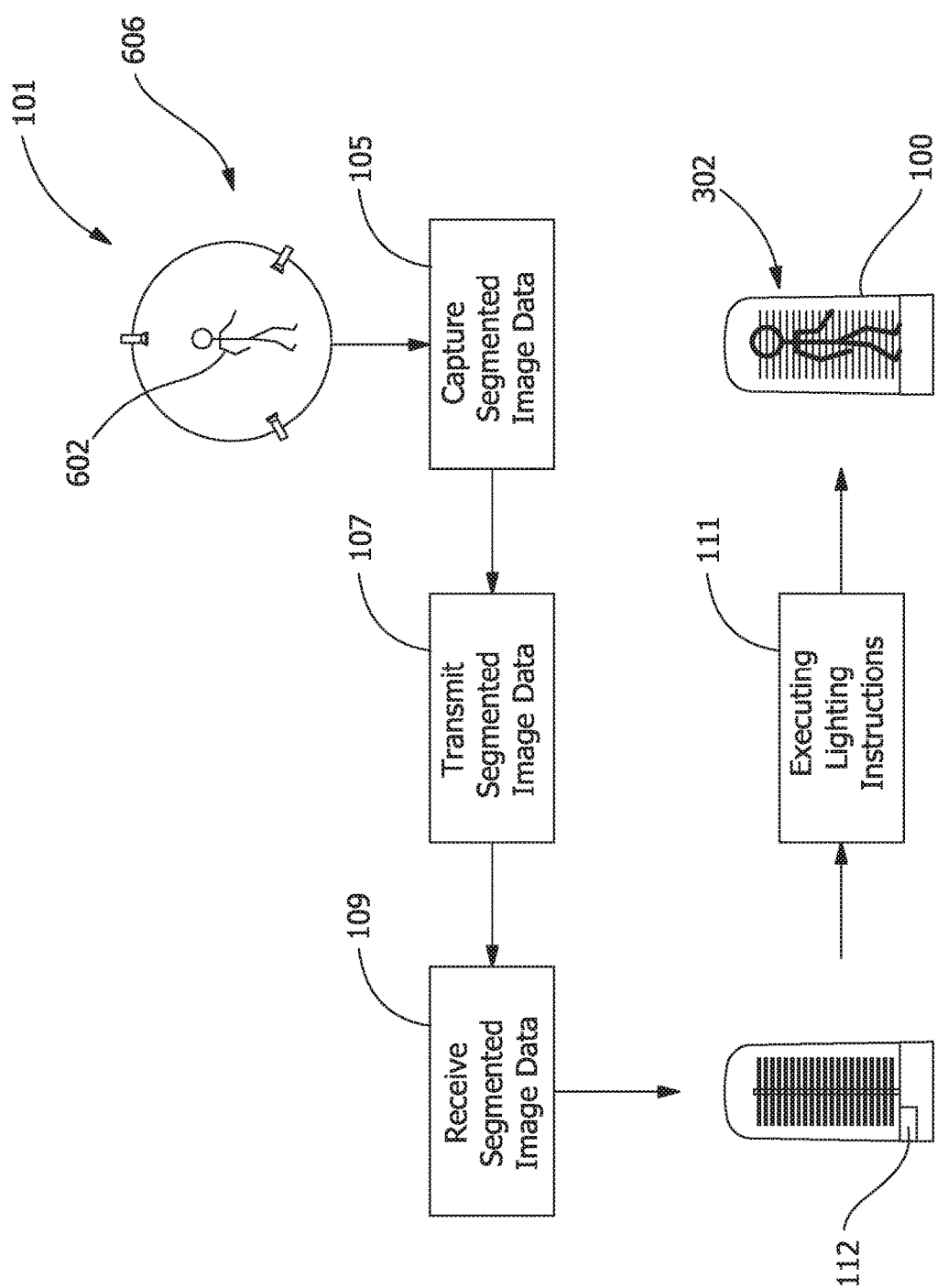
FIG. 10 is a schematic view of an exemplary system and process for three-dimensional display, according to the disclosure.

FIG. 10 schematically shows a system 101 capable of performing a process 103 for displaying the three-dimensional image 302. The system includes the array 606 of the visual detectors 604 and the device 100. The array 606 captures image data (step 105), including segmented images. The image data is transmitted (step 107) from the array 606, directly or indirectly, and received (step 109) by the device 100 and/or a control system 112, where the image data is utilized to execute lighting instructions (step 111) resulting in the illusion of the three-dimensional image 302. The transmission is through any suitable methods, including, but not limited to, wireless (such as, through an infrared, radiofrequency, or any other electromagnetic signal) or wired (such as, through a fiber-optic cable, a coaxial cable, an RCA cable, or any other suitable electrically communicative mechanism). The control system 112 is any suitable control system.

Figure 30:
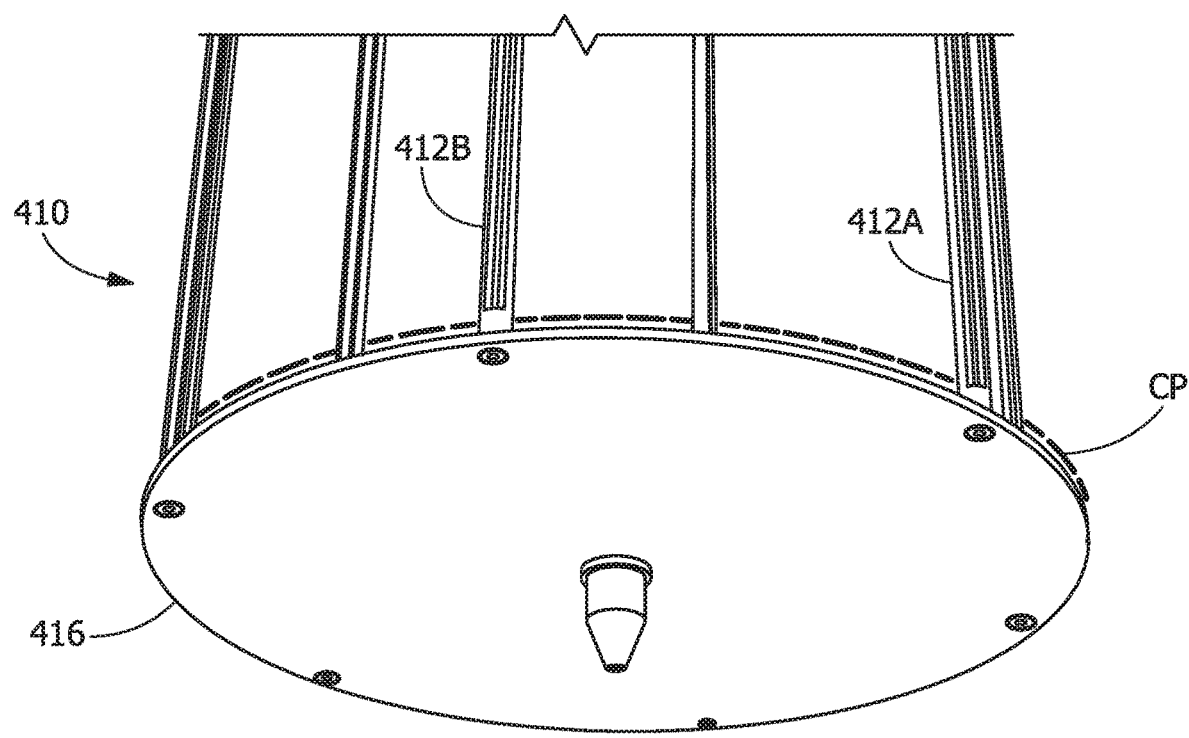
FIG. 30 is a bottom perspective view of a portion of a post of a variation of the additional exemplary embodiment of the display arrangement.
Figure 31:
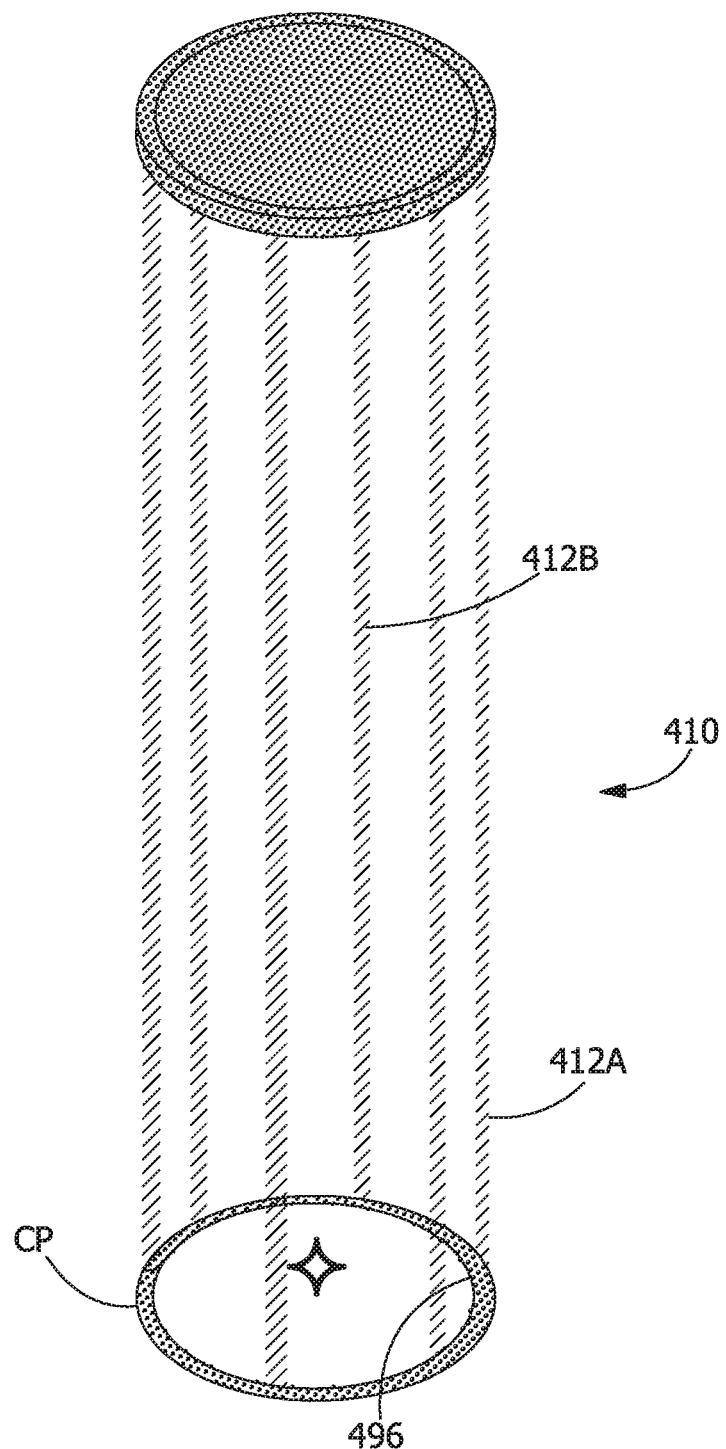
FIG. 31 is a top perspective view of the variation of the additional exemplary embodiment of the display arrangement.
Figure 32:
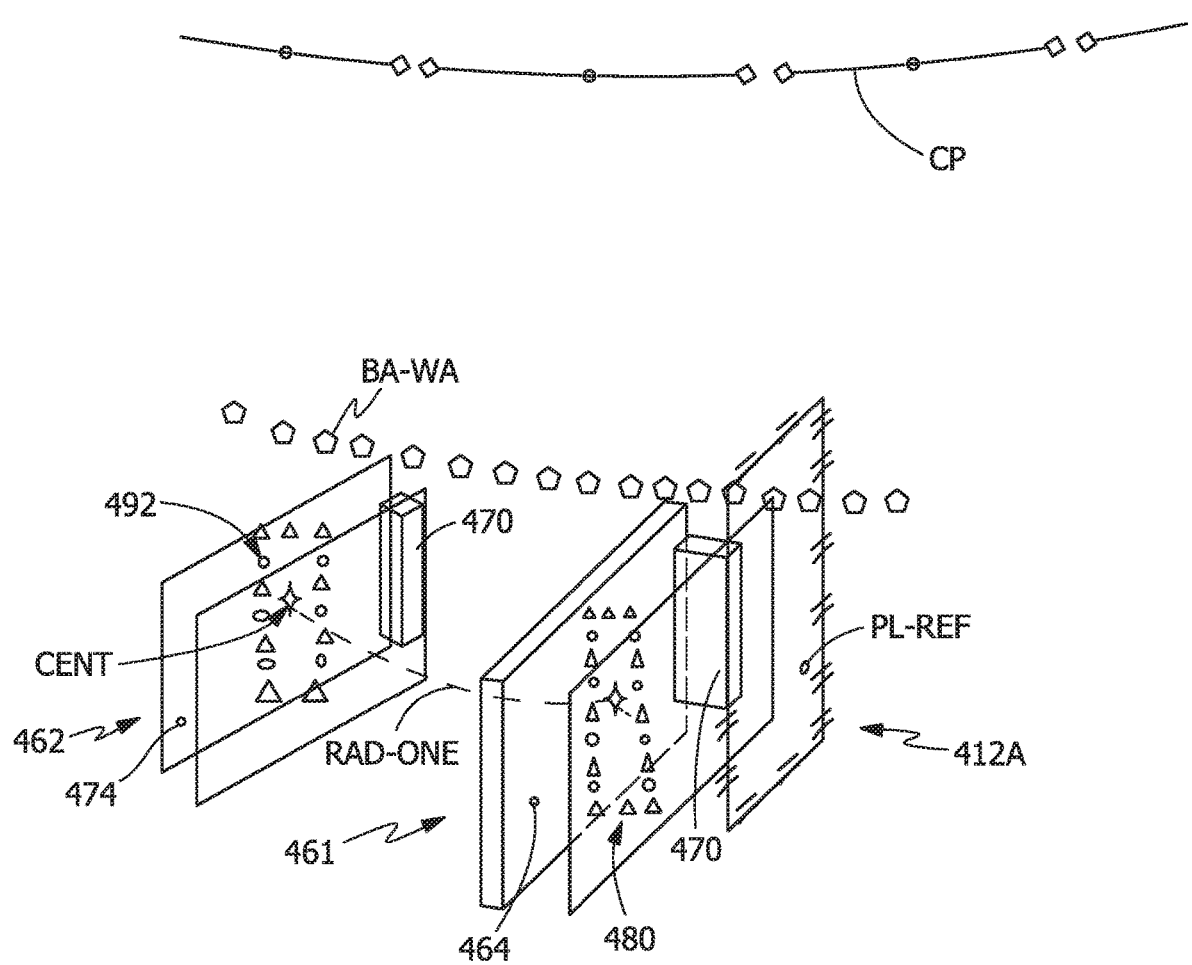
FIG. 32 is an enlarged perspective top view of a portion of a post having an upstream collection group and comprised in the variation of the additional exemplary embodiment of the display arrangement.
Figure 33:
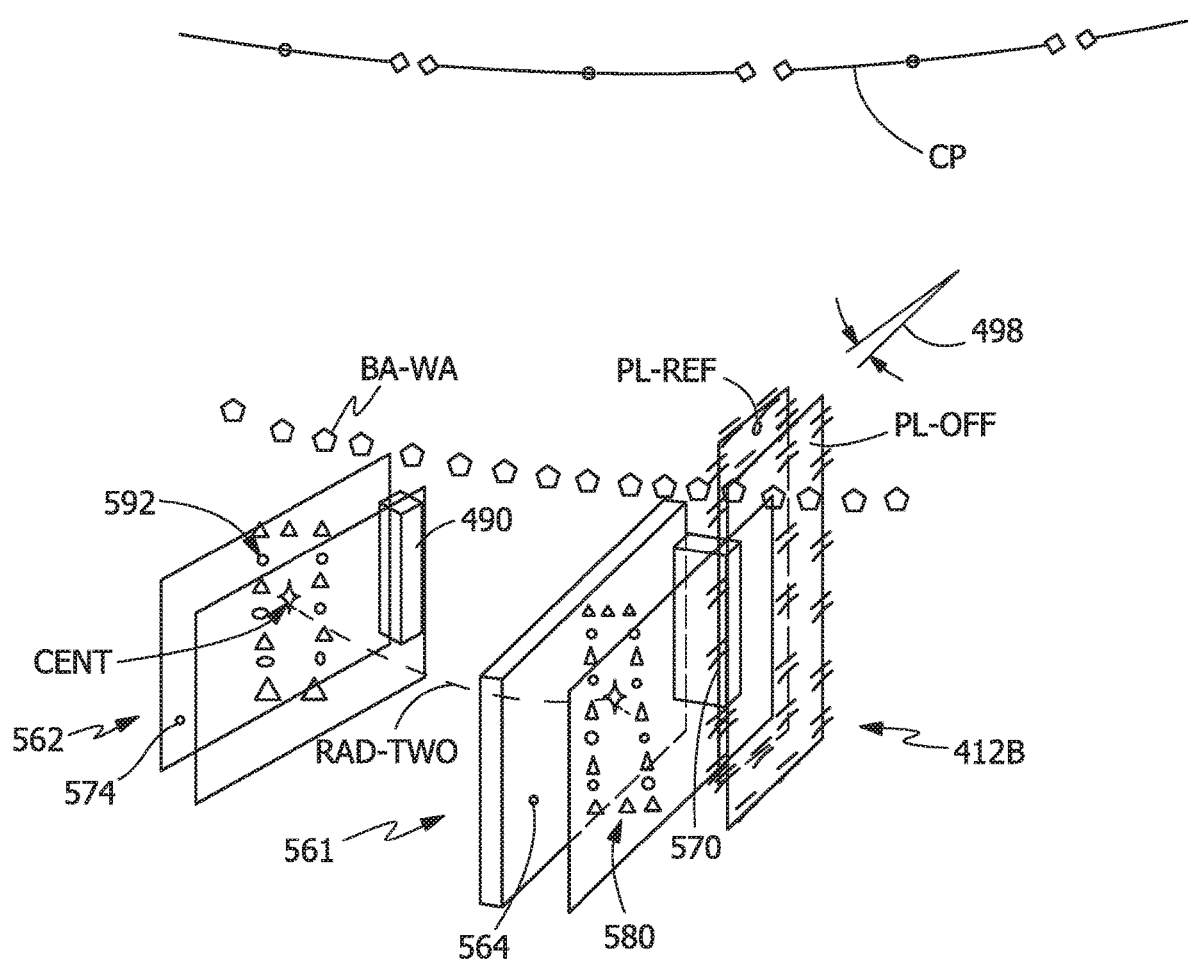
FIG. 33 is an enlarged perspective top view of a portion of a post having a downstream collection group and comprised in a variation of the additional exemplary embodiment of the display arrangement in connection with a description of the variation of the additional exemplary embodiment of the display arrangement.
Figure 34:
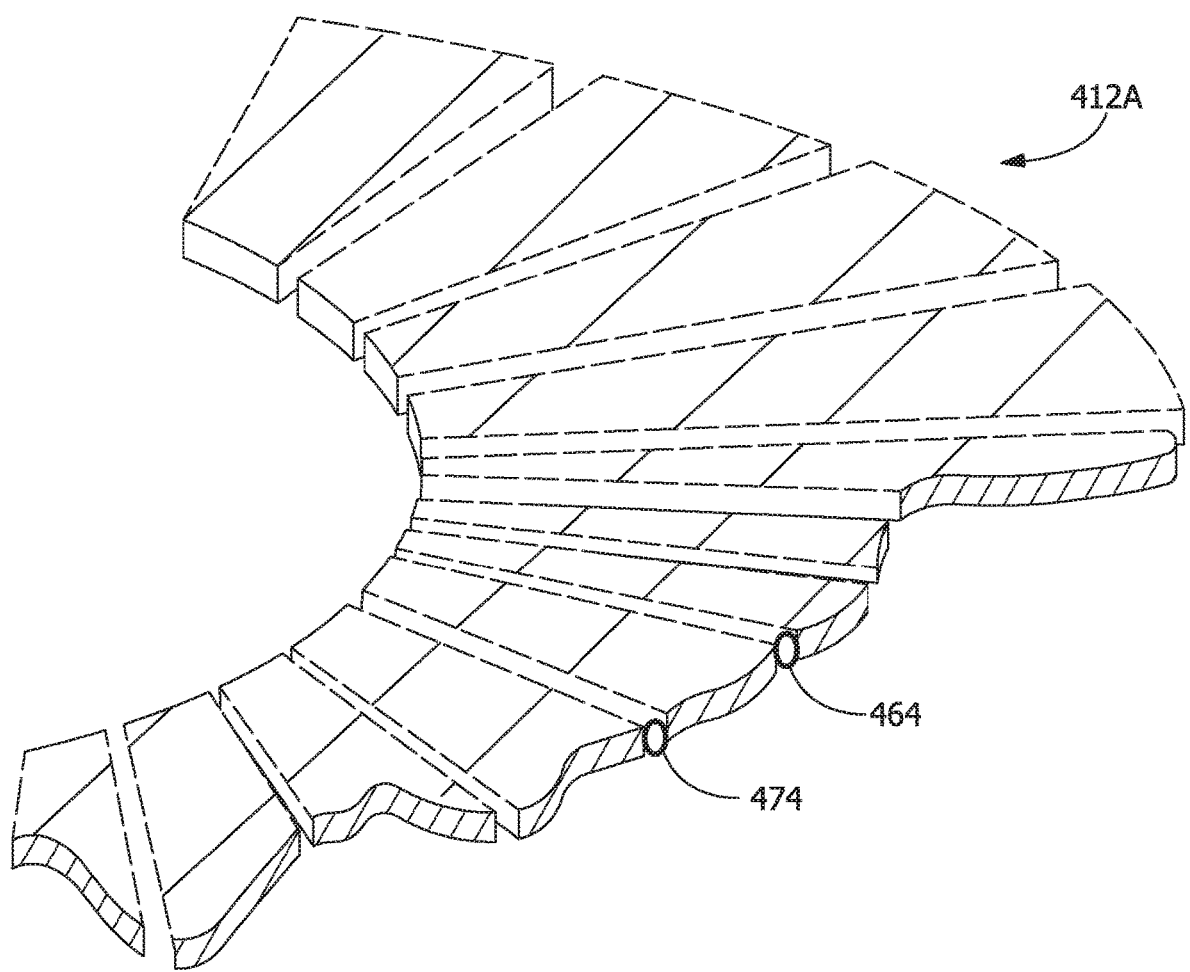
FIG. 34 is a schematic top perspective partial sectional view of the upstream collection group of a post of the variation of the additional exemplary embodiment of the display arrangement.
Figure 35:
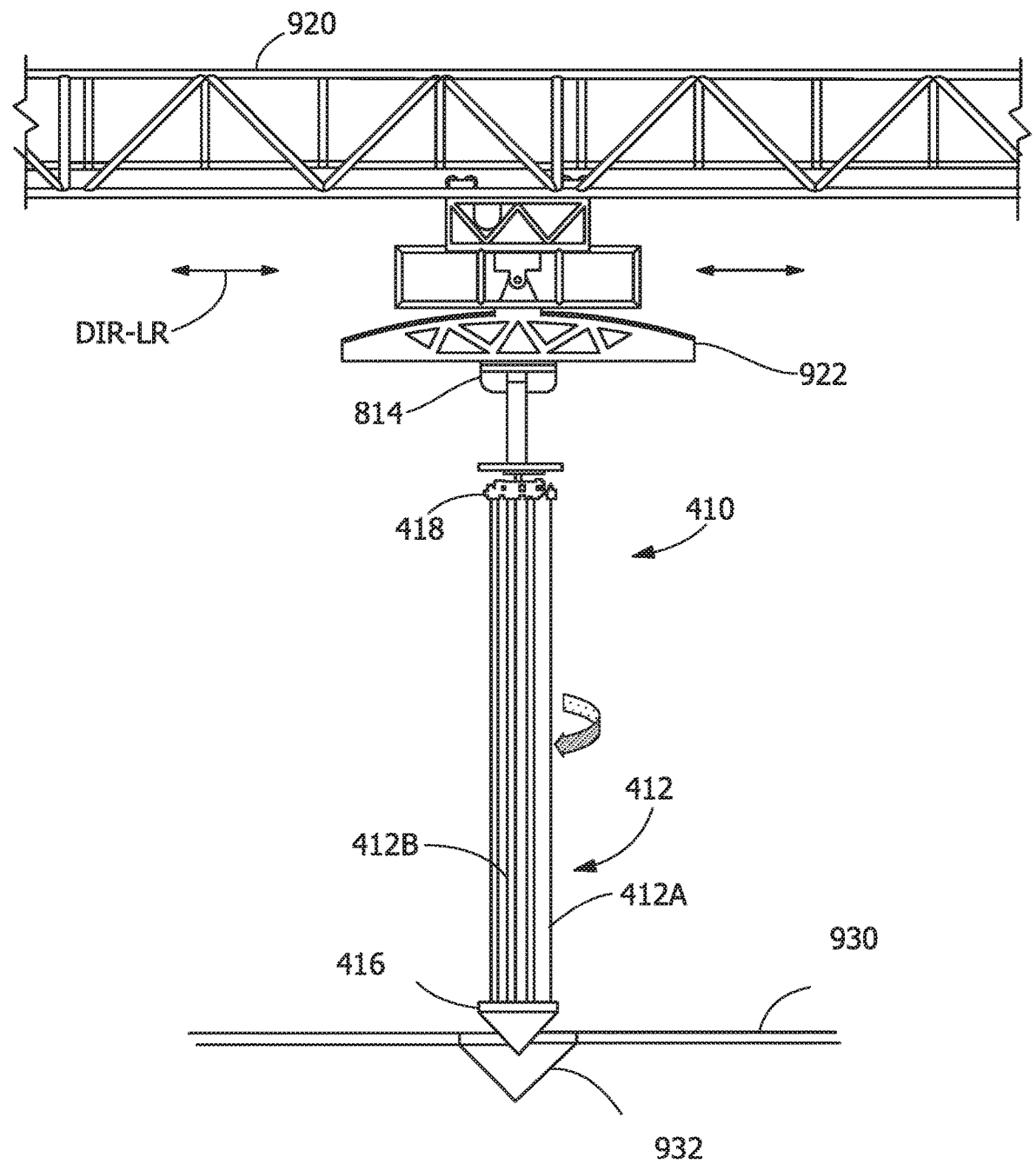
FIG. 35 is a front plan view of the variation of the additional exemplary embodiment of the display arrangement.
Figure 36:
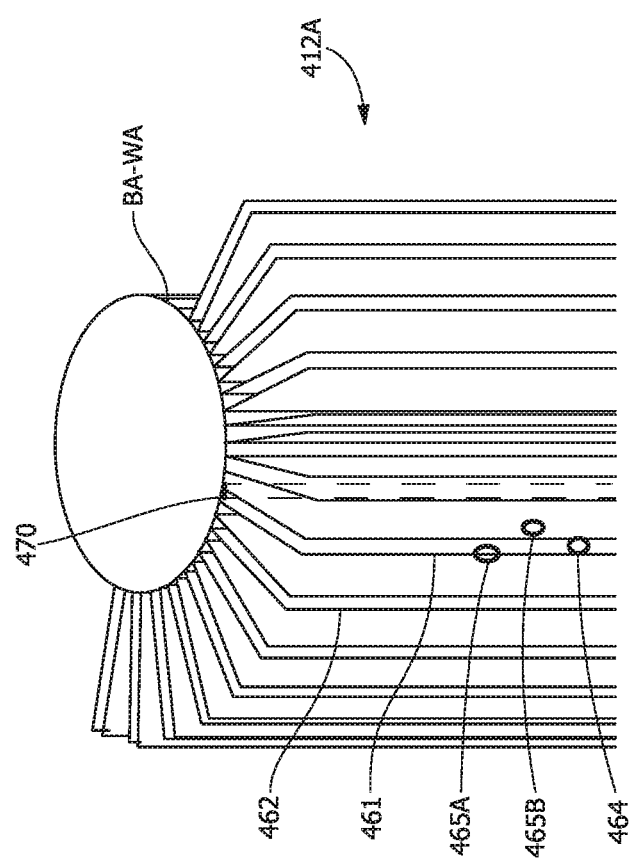
FIG. 36 is an enlarged sectional view of the post shown in FIG. 32.

Reference is now had to FIG. 30, which is a bottom perspective view of a portion of a post of a variation of the additional exemplary embodiment of the display arrangement, FIG. 31, which is a top perspective view of the variation of the additional exemplary embodiment of the display arrangement, FIG. 32, which is an enlarged perspective top view of a portion of a post having an upstream collection group and comprised in the variation of the additional exemplary embodiment of the display arrangement, FIG. 33, which is an enlarged perspective top view of a portion of a post having a downstream collection group and comprised in a variation of the additional exemplary embodiment of the display arrangement in connection with a description of the variation of the additional exemplary embodiment of the display arrangement, FIG. 34, which is a schematic top perspective partial sectional view of the upstream collection group of a post of the variation of the additional exemplary embodiment of the display arrangement, FIG. 35, which is a front plan view of the variation of the additional exemplary embodiment of the display arrangement, and FIG. 36, which is an enlarged sectional view of the post shown in FIG. 32. The variation of the additional exemplary embodiment of the display arrangement is generally designated as the coordinated view display arrangement 410 and comprises several common features also deployed with the display arrangement 810.

The coordinated view display arrangement 410 includes an advancing device, the advancing device having a travel portion and being operable to cyclically advance the travel portion along a circular path CP in an advancing direction. The advancing device is configured as a driven sub-assembly that is rotatably driven by the rotation motor 814, whose operation has been described with respect to the display arrangement 810. The coordinated view display arrangement 410 comprises six individual posts 412 that are secured each at a lower axial end to a lower disc 416 and the posts are distributed at equal circumferential spacings along a selected arcuate extent on the lower disc 416. The posts 412 are also each secured at an upper axial end to an upper disc 418. The posts 412, the upper disc 418, and the lower disc 416 of the coordinated view display arrangement 410, and the thereon secured or connected control, light generating, and other equipment intended to be entrained during rotation, collectively form the driven sub-assembly that is drivingly rotated by the rotation motor 814. Solely for the purpose of illustration, it is deemed that the lower disc 416 functions as the advancing device and an outer annular peripheral portion of the lower disc 416 generally located at a predetermined radius from the center of the circular path CP and passing through the longitudinal center axes of the posts 412 and including the posts 412 comprises the travel portion of the advancing device.

A respective one of the posts 412—designated as the post 412A—comprises an upstream collection group, the upstream collection group having a first pair of guide walls 461 and a second pair of guide walls 462 that provide the slot function herein described. Another one of the posts 412 comprises a downstream collection group and the respective post 412 comprising this downstream collection group—designated as the post 412B—is the respective post 412 adjacent the post 412A comprising the upstream collection group, as viewed in the direction of rotation of the driven sub-assembly. The downstream collection group has a first pair of guide walls 561 and a second pair of guide walls 562. The first pair of guide walls 461 and the second pair of guide walls 462 comprising the upstream collection group of the post 412A are operatively associated with one another in the respect that they cooperate together to provide a guide or a channel for light emanating from a light source associated with these guide walls. Likewise, the first pair of guide walls 561 and the second pair of guide walls 562 comprising the downstream collection group of the post 412B are operatively associated with one another in the respect that they cooperate together to provide a guide or a channel for light emanating from a light source associated with these guide walls.

The upstream collection group of the post 412A and the downstream collection group of the post 412B each comprises additional associated pairs of guide walls that are operatively associated with one another in the respect that they cooperate together to provide a guide or a channel for light emanating from a light source associated with these guide walls. It is to be understood that the disclosure herein of an exemplary operative association between the upstream collection group of the post 412A and the downstream collection group of the post 412B is representative of the operative associations between other posts of the coordinated view display arrangement 410.

Each of the first pair of guide walls 461 of the upstream collection group is supported on the travel portion of the advancing device for advancing movement thereby and delimits a upstream coordinated slot 464 having a length direction, a lateral direction perpendicular to the lateral direction, and a height direction perpendicular to the length direction and the lateral direction. A first ingress in the form of a panel of light-emitting diodes is denominated as the LED panel 470. Each of the first pair of guide walls 561 of the downstream collection group are supported on the travel portion of the advancing device for advancing movement thereby and delimits a upstream coordinated slot 564 having a length direction, a lateral direction perpendicular to the lateral direction, and a height direction perpendicular to the length direction and the lateral direction. A first ingress in the form of a panel of light-emitting diodes is denominated as the LED panel 570.

The LED panels 470, 570 thus each delimit a threshold through which light travels into the upstream coordinated slot 464, 564, the first pair of guide walls 461, 561 of the upstream collection group and the downstream collection group, respectively, being spaced from one another as viewed in the lateral direction of the upstream coordinated slot 464, 564 at least along a portion of their extents sufficient to permit light that has traveled beyond the first LED panels 470, 570 to be viewed by an observer exteriorly of the upstream coordinated slot 464, 564, with the respective area of the first slot, as viewed in the lateral and height directions, having light passing therethrough that can be viewed by the observer and being deemed the view window 480 of the upstream coordinated slot 464 (or, respectively, the view window 580 of the first slot 564).

Each of the second pair of guide walls 462 of the upstream collection group is supported on the travel portion of the advancing device for advancing movement thereby and delimits a second slot 474. A second ingress delimits a threshold through which light travels into the second slot 474, and the second ingress is in the form of a panel of light-emitting diodes denominated as the LED panel 490. Each of the second pair of guide walls 562 of the downstream collection group are supported on the travel portion of the advancing device for advancing movement thereby. A second ingress delimits a threshold through which light travels into the second slot 574 and the second ingress is in the form of a panel of light-emitting diodes denominated as the LED panel 590.

The second pair of guide walls 462, 562 of the upstream collection group and the downstream collection group are spaced from one another as viewed in a lateral direction at least along a portion of their extents sufficient to permit light that has traveled past the second ingress to be viewed by an observer exteriorly of the second slot 474, 574, the respective area of the second slot, as viewed in the lateral and height directions, having light passing therethrough that can be viewed by the observer and being deemed the view window 492 of the second slot 474 (or, respectively, the view window 592 of the second slot 574).

The view windows of the slots of the downstream collection group are located downstream of the view windows of the slots of the upstream collection group relative to the advancing direction of the travel portion along a circular path CP such that, during each full cycle travel of the travel portion of the advancing device along the circular path, the view windows of the slots of the downstream collection group cyclically travel past a given location on the circular path before the view windows of the first slots of the upstream collection group have traveled past the given location.

The center CENT of the areas of the view windows of the first and second slots of the upstream collection group lie on a collection circle RAD-ONE having a radius less than the radius of the circular path CP. The center CENT of the areas of the view windows of the first and second slots of the downstream collection group lie on a collection circle RAD-TWO having a radius less than the radius of the circular path CP.

A selected one of the slots of the upstream collection group and a selected one of the slots of the downstream collection group are in a coordinated relationship with one another, wherein the selected one slot of the upstream collection group (for exemplary purposes, deemed to be the upstream coordinated slot 460) is deemed to be the upstream coordinated slot and the selected one slot of the downstream collection group (for exemplary purposes, deemed to be the downstream coordinated slot 560) is deemed to be the downstream coordinated slot. The upstream coordinated slot 460 delimits a reference bisector plane PL-REF extending in the length direction of the slot and bisecting the view window 480 of the slot such that one-half of the area of the view window lies on one side of the reference bisector plane and the other half of the area of the view window lies on the opposite side of the reference bisector plane.

The downstream coordinated slot 560 delimits an offset bisector plane PL-OFF extending in the length direction of the slot and bisecting the view window of the slot such that one-half of the area of the view window lies on one side of the offset bisector plane and the other half of the area of the view window lies on the opposite side of the offset bisector plane. The reference bisector plane PL-REF of the upstream coordinated slot 460 and the offset bisector plane PL-OFF of the downstream coordinated slot 560 are at an offset angle to one another (designated as the offset angle 498), wherein the reference bisector plane PL-REF of the upstream coordinated slot 460 and the offset bisector plane PL-OFF of the downstream coordinated slot 560 are in non-parallel relationship with one another. The present invention contemplates that the panels of LED panels 470, 570 can be operated to provide light output that, when an observer views the coordinated view display arrangement 410, will facilitate the ability to process the light output in a manner in which the observer perceives a substantially coherent image. One approach to implementing this coordinated operation of the panels of LED panels 470, 570 involves controlling the light output of the panels of LED panels 470, 570 in a manner in which the light output generated by the panel of LED panel 470 that the observer views as the panel of LED panel 470 cyclically sweeps through the field of vision of the observer is specifically controlled to complement the light output of the panel of LED panel 570 so that this pair of light outputs, in combination, are perceivable by the observer in such a manner that the observer perceives that the coordinated view display arrangement 410 is displaying a substantially coherent whole image. One technique for accomplishing this purpose of facilitating the perception of a substantially coherent whole image can involve controlling the light output of the panels of LED panels 470, 570 in a manner analogous to the concept of interleaving or in a manner analogous to the concept of interlacing. The concepts of interleaving and interlacing generally encompass a range of implementations, which commonly involve the partial or incomplete display of a given image via a first image display element and a display of the remainder of the given image via a second image display element.

With respect to an implementation of these concepts to enable the coordinated view display arrangement 410 to facilitate the perception of a substantially coherent whole image, such an implementation may involve: (a) assessing the totality of light outputs that would need to be provided to present an observer with a sufficiently delineated image that the observer perceives that a substantially coherent whole image is being displayed, (b) allocating a portion of the determined light outputs (e.g., less than the totality of light outputs) to be outputted by a selected one of the panel of LEDs, and (c) allocating some or all of the remainder portion of the determined light outputs to another selected one of the panel of LEDs. Solely for the sake of providing an exemplary illustration of one possible mode of operating the coordinated view display arrangement 410, reference is had to FIG. 32, FIG. 33, and FIG. 36, which is an enlarged sectional view of the post shown in FIG. 32, and, in connection with this, let it be assumed that light is only to be outputted via the panels of LED panel 470 of the upstream coordinated slot 460 of the respective upstream collective group configured on the post 412A and via the panels of LED panel 570 of the downstream coordinated slot 560 of the respective downstream collective group configured on the post 412B, it being understood that a given operation of the coordinated view display arrangement 410 may alternately involve supplying light outputs via more up to the entirety of the panel of LEDs of the coordinated view display arrangement 410. Furthermore, let it be assumed in this hypothetical scenario that an execution of the step (b) results in allocating a portion of the determined light outputs (e.g., less than the totality of light outputs) to be outputted by the panels of LED panel 470 of the upstream coordinated slot 460 of the respective upstream collective group configured on the post 412A while an execution of the step (c) results in allocating all of the remainder portion of the determined light outputs to the panels of LED panel 570 of the downstream coordinated slot 560 of the respective downstream collective group configured on the post 412B.

Moreover, let it be assumed that the respective portion of the determined light outputs (e.g., less than the totality of light outputs) to be outputted by the panels of LED panel 470 of the upstream coordinated slot 460 of the respective upstream collective group configured on the post 412A is a one-half portion of the totality of light outputs (i.e., fifty percent (50%) of the totality of light outputs) while the remainder one-half portion of the totality of light outputs (i.e., fifty percent (50%) of the totality of light outputs) of the determined light outputs to be outputted is outputted via a single panel of LEDs—namely, via the panels of LED panel 570 of the downstream coordinated slot 560 of the respective downstream collective group configured on the post 412B is the remainder one-half portion of the totality of light outputs (i.e., fifty percent (50%) of the totality of light outputs). Additionally, let it be assumed that the substantially coherent whole image that it is desired that the coordinated view display arrangement 410 should display is the image of an individual in a partially crouched position that is shown, at various viewing sight lines, as the images IMG-1, IMG-2, and IMG-3 shown in FIG. 16 and let it be further assumed that the respective portion of the determined light outputs (e.g., less than the totality of light outputs) to be outputted by the panels of LED panel 470 of the upstream coordinated slot 460 of the respective upstream collective group configured on the post 412A are the light outputs that display the right-hand (determined relative to an observer facing the front of the individual in a partially crouched position) longitudinal half of the individual in a partially crouched position while the panels of LED panel 570 of the downstream coordinated slot 560 of the respective downstream collective group configured on the post 412B are the light outputs that display the left-hand longitudinal half of the individual in a partially crouched position.

Furthermore, let it be assumed that the slots of each of the posts 412, including the posts 412A, 412B, are distributed with their radial inward end (relative to the circular path CP) at generally equal spacings from one another arcuately around a generally semi-annular extent of a backstop wall BA-WA to which the guide walls of the slots are secured. Additionally, the slots are distributed in a distribution bisected by an extent of a radius line of the circular path CP. For example, in the event that there are a total of fourteen (14) slots configured on each post 412, then one-half of the slots—i.e., seven (7) slots—can be configured to one respective side of a plane incorporating the given radius line of the circular path CP and perpendicular to the angular movement of the advancing device and the other one-half of the slots—i.e., seven (7) slots—can be configured to the other respective side of the plane. Accordingly, it can be understood that an observer situated at any desired angular location relative to the coordinated view display arrangement 410 will view light outputted via the panels of LED panel 470 of the upstream coordinated slot 460 of the respective upstream collective group configured on the post 412A and light outputted via the panels of LED panel 570 of the downstream coordinated slot 560 of the respective downstream collective group configured on the post 412B and will, in accordance with the principle of persistence of vision, perceive the image of the individual in a partially crouched position as a substantially cohesive whole image.

As seen in FIG. 34, which is a schematic top perspective partial view of the upstream collection group of a post of the coordinated view display arrangement 410, each guide wall of each post may be configured as a planar deck having a rectilinear shape and the guide walls of each associated pair of guide walls of each post may additionally be configured to extend parallel to one another. For example, as seen in FIG. 36, the slot 464 is bounded by a pair of guide walls 465A, 465B that are parallel to one another, the pair of guide walls 465A, 465B being an associated pair of guide walls of the post 412A. Continuing, each associated pair of guide walls of a post may be configured as a planar deck and additionally configured such that the radial inner edge of each planar deck-shaped guide wall (as viewed relative to the driven sub-assembly) is secured to a backstop wall BA-WA having a radius of generally between one-twentieth ($\frac{1}{20}^{th}$) and one-tenth ($\frac{1}{10}^{th}$) the value of the radius of the circular path CP. For example, the backstop wall BA-WA may have a radius of approximately 1.22 (one and twenty-two one hundredths) inches and the radius of the circular path CP may have a value of twenty-three (23) inches. Additionally, the guide walls of each associated pair of guide walls of each post may be configured to be substantially more light-absorbing than light reflecting and so may be colored with a dark color to achieve this objective. Also, each guide wall may have a length in the range of one to two inches or, if desired, a length of one and three-eighths inches (1⅜ inches).

Figure 37:
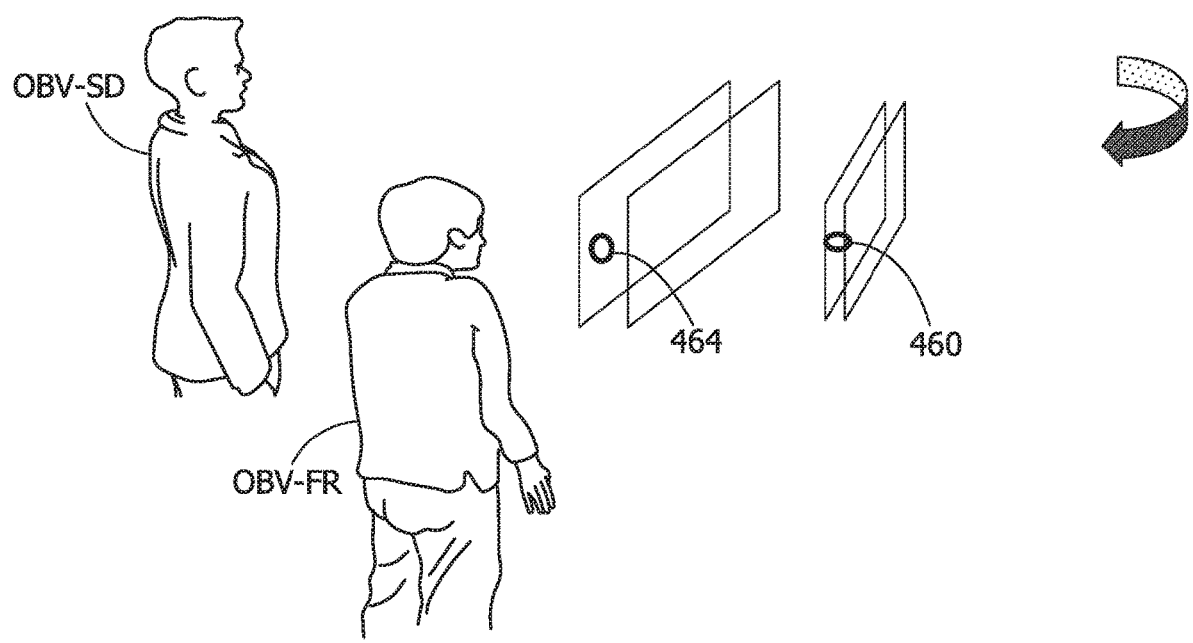
FIG. 37 is a front schematic perspective view of an observer observing the view windows as these view windows are advanced.

In connection with one aspect of the present invention, each associated pair of guide walls of a post are configured as a planar deck and additionally configured such that the radial inner edge of each planar deck-shaped guide wall (as viewed relative to the driven sub-assembly) is secured to the backstop wall BA-WA. Further in connection with this one aspect of the present invention, a respective one of the planar deck-shaped guide walls of each associated pair of guide walls of a selected post functions as a forward upstream sight-reducing element and the other respective one of the planar deck-shaped guide walls of each associated pair of guide walls of the selected posts functions as a lagging upstream sight-reducing element and is located relative to the forward upstream sight-reducing element such that the lagging upstream sight-reducing element, during each full cycle travel of the travel portion of the advancing device along the circular path, reduces the percentage of the display range of the view window of the forward upstream sight-reducing element available within the line of sight of an observer remaining at a fixed angular location, whereupon, during each cycle of travel, the display range of the view window of the forward upstream sight-reducing element is available to an observer remaining at a fixed angular location through is able to cyclically view the display range of the view window of the forward upstream sight-reducing element through a predetermined extent of angular displacement of the view window and the lagging upstream sight-reducing element progressively reduces to zero the percentage of the display range of the view window of the forward upstream sight-reducing element available to be viewed by the observer as a function of the advancing movement of the view window. As seen in FIG. 37, which is a front schematic perspective view of an observer observing the view windows as these view windows are advanced, an observer OBV-FR at a fixed angular location observes the slots 460, 464 and the respective pair of guide walls associated with the slot 460 progressively reduces to zero the percentage of the display range of the view window of the slot 464, whereupon the observer OBV-FR no longer views light in the view window of the slot 464. An observer OBV-SD, who is located at another fixed angular location angularly spaced from the location of the observer OBV-FR, will view different light outputs than the observer OBV-FR, whereupon this observer OBV-SD will perceive an image different than that viewed by the observer OBV-FR (e.g., the observer OBV-SD may view an image of a side view of the partially crouching figure while the observer OBV-FR views an image partially representing a side view of the partially crouching figure and partially representing a front view of the partially crouching figure).

Further in connection with this one aspect of the present invention, a respective one of the planar deck-shaped guide walls of each associated pair of guide walls of a selected post functions as a forward downstream sight-reducing element and the other respective one of the planar deck-shaped guide walls of each associated pair of guide walls of such selected posts functions as a lagging downstream sight element and is located relative to the forward downstream sight-reducing elements such that the lagging downstream sight-reducing element, during each full cycle travel of the travel portion of the advancing device along the circular path, reduces the percentage of the display range of the view window of the forward downstream sight-reducing element available within the line of sight of an observer remaining at a fixed angular location, whereupon, during each cycle of travel, the display range of the view window of the forward downstream sight-reducing element is available to an observer remaining at a fixed angular location through is able to cyclically view the display range of the view window of the forward downstream sight-reducing element a predetermined extent of angular displacement of the view window and the lagging downstream sight-reducing element progressively reduces to zero the percentage of the display range of the view window of the forward downstream sight-reducing element available to be viewed by the observer as a function of the advancing movement of the view window.

Figure 38:
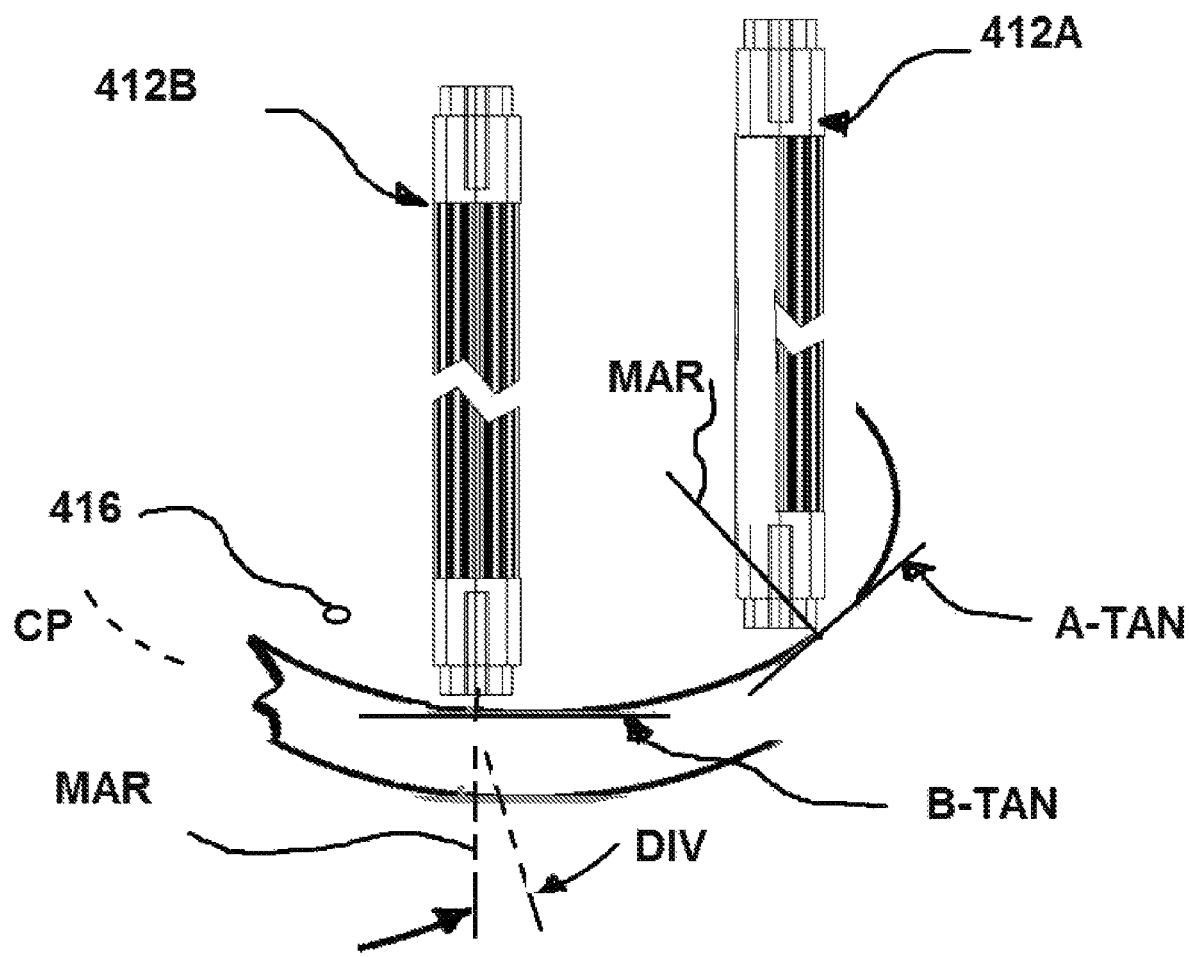
FIG. 38 is an exploded perspective view of an additional further exemplary embodiment of the display arrangement.
Figure 39:
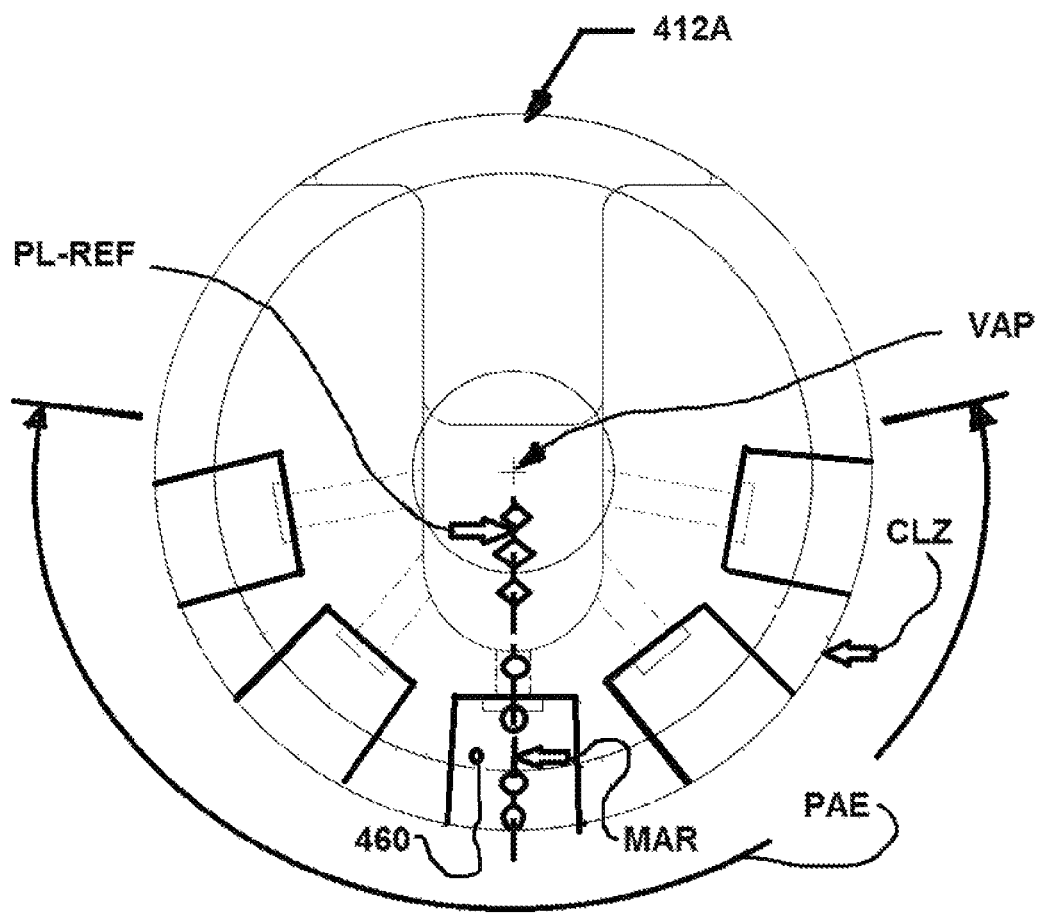
FIG. 39 is a top plan sectional view of a post shown in FIG. 38.

In connection with an additional further aspect of the present invention, reference is now had to FIGS. 38 and 39. This additional further aspect of the present invention is a modified version of the variation of the additional exemplary embodiment of the display arrangement that has been described with respect to FIGS. 30-37. In connection with this modified version of the variation of the additional exemplary embodiment of the display arrangement, the posts 412 are assigned for operational purposes to respective alliances and each alliance of a respective plurality of the posts 412 is configured such that the respective posts 412 have an operational relationship with one another, which is described in more detail herein. This operational relationship between the respective allied posts 412 of each alliance of the posts 412 is in the nature of a view enhancing relationship in that the light controlled to be displayed via the slots of the allied posts 412 is specifically influenced to improve the presentation observed by an observer.

For the purpose of providing an example of this operational relationship between the respective allied posts 412, reference is had to the post 412A and the post 412B, which are deemed to form together a respective one of the alliances between the posts 412—i.e., the post 412A and the post 412B are deemed to be allied posts. As has been described, the coordinated slot 460 is formed by the post 412A, which comprises the upstream collection group having the first pair of guide walls 460 and the second pair of guide walls 462, and the coordinated slot 560 is formed by the post 412B, which is the respective post 412 adjacent the post 412A comprising the downstream collection group, as viewed in the direction of rotation of the driven sub-assembly. As seen in FIG. 38, which is a schematic top perspective view of a portion of the driven sub-assembly, the circular path CP is delimited by the outer circumferential annular edge of the lower disc 416 and the post 412A and the post 412B are disposed such that their respective lower axial ends are fixedly secured to the lower disc 416 and these lower axial ends of the post 412A and the post 412B intersect the circular path CP.

As seen in FIG. 39, which is a top plan sectional view of the post 412A, the post 412A is shown solely for illustration purposes as delimiting an annular shape circumscribed around a vertical axis VAP extending through the upper and lower axial ends of the post. The post 412A comprises a total of five slots, each of which is delimited by a respective pair of guide walls that extend parallel to each other along a radius of the vertical axis VAP of the post 412A, and the slots are each characterized by a view window of identical dimensions to the view windows of the remainder of the slots of the post 412A. The respective bisector plane of the view windows of each of the slots of the post 412A extends along a respective radius of the vertical axis VAP. Accordingly, the reference bisector plane PL-REF, which extends in the length direction of the slot 460, extends along a respective radius of the vertical axis VAP. Additionally, the reference bisector plane PL-REF bisects the view window 480 of the slot 460 such that one-half of the area of the view window lies on one side of the reference bisector plane PL-REF and the other half of the area of the view window 480 lies on the opposite side of the reference bisector plane PL-REF.

The five slots of the post 412A are distributed angularly at uniform angular spacings about a predetermined angular extent that is less than a full circumferential angular extent (e.g., a predetermined angular extent less than three hundred and sixty degrees) and that is slightly larger than an angular extent of one hundred and eighty degrees. The predetermined angular extent about which the five slots of the post 412A are distributed angularly at uniform angular spacings is shown as the predetermined angular extent PAE in FIG. 39. The middle one of the five slots of the post 412A, as viewed with respect to the angular distribution of the slots about the predetermined angular extent PAE—namely, the third slot—is arbitrarily deemed to be the slot 460. A respective radius of the vertical axis VAP of the post 412A is denominated as a mounting orientation radius MAR (representatively shown in FIG. 39 as a line having spaced circles) and the reference bisector plane PL-REF that bisects the view window 480 of the slot 460 extends along this mounting orientation radius MAR. The bisector plane PL-REF is representatively shown in FIG. 39 as a line having spaced diamond-shaped symbols. Each of the other posts 412, including the post 412B, is identically configured as the post 412A, whereupon the allied post 412B has five slots and the middle one of the five slots of the post 412B, as viewed with respect to the angular distribution of the slots about the predetermined angular extent PAE—namely, the third slot—is arbitrarily deemed to be the slot 560.

With reference now to FIG. 38, it can be seen that the post 412A is mounted to the lower disc 416 in an orientation such that the mounting orientation radius MAR of the post 412A is perpendicular to a respective tangent of the circular path CP, hereby denominated as a tangent A-TAN. The post 412B is mounted to the lower disc 416 in an orientation such that the mounting orientation radius MAR of the post 412B is at a respective angle to a respective tangent of the circular path CP, hereby denominated as a tangent B-TAN, and this respective angle of the mounting orientation radius MAR of the post 412B to the tangent B-TAN of the circular path CP is selected to be an angle that is not a ninety-degree angle for reasons that are described herein. The operational relationship between the respective allied posts 412A, 412B is in the nature of a view enhancing relationship in that the light controlled to be displayed via the slots of the posts 412A, 412B is specifically influenced to improve the presentation observed by an observer. This view enhancing relationship can be achieved via a single view enhancement approach or a combination of view enhancement approaches in accordance with the present invention. Each view enhancement approach is specifically configured to diminish or completely eliminate certain disadvantageous aspects of the inter-slot configuration of each post 412A and post 412B. The inter-slot configuration of the post 412A, for example, is comprised of the respective structures of the post that are present between each slot and the next angularly adjacent slot, as viewed along the predetermined angular extent PAE and each respective structure is denominated as a circumferential limit zone CLZ, as seen in FIG. 39.

Each circumferential limit zone CLZ is delimited by the radially outermost edges of the neighboring guide walls of a slot and its next angularly adjacent slot and structural material or voids that are angularly intermediate these radially outermost edges. As an example of an exemplary disadvantageous aspect of the inter-slot configuration of the post 412A, let it be assumed that the radially outermost edges of the neighboring guide walls of the slot 460 of the post 412A and its next angularly adjacent slot delimit a region in which a light-absorbing structural material is present—for example, a light-absorbing structural material in the form of a generally smooth surface uniformly colored in the color black so as to have a behavior as a light-absorbing material. It can be understood that this black surface of the circumferential limit zone CLZ extending between the radially outermost edges of the neighboring guide walls of the slot 460 of the post 412A will influence the presentation viewed by an observer in that the presentation will have a vertical dark line of a predetermined angular dimension and this vertical dark line may negatively impact or detract from the capability of the display arrangement to present, to the greatest extent possible, an optimally coherent or consistently formatted presentation. For example, the presentation may be comprised of an image or avatar preferably viewed as having some regions in a relatively lighter color and other regions in a relatively darker color and the vertical dark line of a circumferential limit zone CLZ of the post 412A may negatively distort a region of the image or avatar of a relatively lighter color to instead have a color that is darker than desired or may impose a visually distracting region that detracts from the presentation viewed by the observer.

An example of a single view enhancement approach that contributes to a view enhancing relationship which advantageously influences the light controlled to be displayed via the slots of the post 412A is an approach of providing a controllable light ingress at each circumferential limit zone CLZ of the post 412A. For example, a light emitting diode (LED) may be disposed at each circumferential limit zone CLZ of the post 412A and the light emission of each light emitting diode can be controlled in coordination with the light passing through the view windows of the slots of the post 412A. Another example of a single view enhancement approach that contributes to a view enhancing relationship which advantageously influences the light controlled to be displayed via the slots of the post 412A is an approach of providing a predetermined divergence of the orientation of a post with respect to the circular path CP as compared to the orientation of an allied post with respect to the circular path CP. One example of an implementation of this approach is shown in FIG. 38. As has been described, the post 412A is mounted to the lower disc 416 in an orientation such that the mounting orientation radius MAR of the post 412A is perpendicular to the tangent A-TAN of the circular path CP and the post 412B is mounted to the lower disc 416 in an orientation such that the mounting orientation radius MAR of the post 412B is at a respective angle to the tangent B-TAN of the circular path CP selected to be an angle that is not a ninety-degree angle. Specifically, the mounting orientation radius MAR of the post 412B is at an angle with respect to the tangent B-TAN of the circular path CP—hereby denominated as a diversion angle DIV—having a value that is in a range between ten degrees up to and including eighty-nine degrees different than the value of the angle of the mounting orientation radius MAR of the allied post 412A to the tangent A-TAN of the circular path CP. The diversion angle DIV is most preferably at a value of nine degrees different than the value of the angle of the mounting orientation radius MAR of the allied post 412A to the tangent A-TAN of the circular path CP. According to this most preferred configuration of the display assembly in connection with this example of an implementation of an approach of providing a predetermined divergence of the orientation of a post with respect to the circular path CP as compared to the orientation of an allied post with respect to the circular path CP, the mounting orientation radius MAR of the post 412A is perpendicular to the tangent A-TAN of the circular path CP—that is, the mounting orientation radius MAR of the post 412A is at angle of ninety degrees to the tangent A-TAN of the circular path CP—and the mounting orientation radius MAR of the post 412B is at an angle with respect to the tangent B-TAN of the circular path CP—the diversion angle DIV—having a value of eighty-one degrees determined by the formula: [90−9=81 degrees].

A coordinated operation of the LED panels 470, 570 provided with respect to the slot 460, 560, respectively, involves controlling the light output of the LED panels 470, 570 in a manner in which the light output generated by the LED panel 470 that the observer views as the LED panel 470 cyclically sweeps through the field of vision of the observer is specifically controlled to complement the light output of the LED panel 570 so that this pair of light outputs, in combination, are perceivable by the observer in such a manner that the observer perceives that the coordinated view display arrangement 410 is displaying a substantially coherent whole image. The view enhancing approach of providing the diversion angle DIV with respect to the post 412B can be coordinated with this approach for controlling the light output of the LED panels 470, 570 such that the presentation viewed by the observer is enhanced. For example, the same image or a correlated image can be outputted from the LED panels 470, 570 and an advantageous influence may be gained in that the orientation of the post 412B at the diversion angle DIV results in the respective images outputted from the LED panels 470, 570 mutually reinforcing each other to the betterment of the presentation viewed by the observer.

The additional further aspect of the present invention thus provides a display arrangement for creating a visual effect, wherein the display arrangement includes (a) a rotatable element having a center about which the rotatable element is rotatable, (b) a plurality of view restricting elements, the view restricting elements being commonly mounted in an angular manner on the rotatable element at angular spacings from one another, and (c) a plurality of image display surfaces each disposed between a respective pair of view restricting elements. The image displaying portions are commonly mounted in an angular manner on the rotatable element, a first one of the image displaying portions includes a plurality of slots each providing a view window through which light passes, a second one of the image displaying portions includes an identical number of slots as the first one of the image displaying portions, the slots of the first one of the image displaying portions are distributed angularly at uniform angular spacings about a predetermined angular extent that is less than a full circumferential angular extent, the first one of the image displaying portions is mounted relative to a circular path centered on the center of the rotatable element such that the predetermined angular extent of the slots is bisected by a radius that is tangent to the circular path and the slots of the second one of the image displaying portions are distributed angularly at uniform angular spacings about a predetermined angular extent that is less than a full circumferential angular extent, the second one of the image displaying portions is mounted relative to the circular path such that the predetermined angular extent of the slots is bisected by a radius that is not tangent to the circular path.

In one embodiment, an arrangement for presenting a display, the arrangement comprising an advancing device, the advancing device having a travel portion and being operable to cyclically advance the travel portion along a circular path in an advancing direction. The arrangement further includes an upstream collection group, the upstream collection group having at least a first pair of passageway portions and a second pair of passageway portions, and a downstream collection group, the downstream collection group having at least a first pair of passageway portions and a second pair of passageway portions. The arrangement further includes each of the first pair of passageway portions of the upstream collection group and the downstream collection group being supported on the travel portion of the advancing device for advancing movement thereby, and each of the first pair of passageway portions of the upstream collection group and the downstream collection group delimiting a first passageway having a first length direction, a first lateral direction perpendicular to the first length direction, and a first height direction perpendicular to the first length direction and the first lateral direction. The arrangement further includes a first ingress, the first ingress delimiting a threshold through which light travels into the first passageway, a respective area of the first passageway, as viewed in the first lateral and first height directions, having light passing therethrough and being deemed a first view window of the first passageway. Light at the first view window can be viewed by an observer and the first pair of passageway portions of the upstream collection group and the downstream collection group being spaced from one another as viewed in the first lateral direction of the first passageway at least along a portion of their extents beyond the first view window as viewed in the first length direction to permit light that has traveled past the first ingress to be viewed by an observer exteriorly of the first passageway. The arrangement further includes each of the second pair of passageway portions of the upstream collection group and the downstream collection group being supported on the travel portion of the advancing device for advancing movement thereby and delimiting a second passageway having a second length direction. The arrangement further includes a second lateral direction perpendicular to the second length direction, and a second height direction perpendicular to the second length direction and the second lateral direction. The arrangement further includes a second ingress, the second ingress delimiting a threshold through which light travels into the second passageway, a respective area of the second passageway, as viewed in the second lateral and second height directions, having light passing therethrough and being deemed a second view window of the second passageway. Light at the second view window can be viewed by the observer and the second pair of passageway portions of the upstream collection group and the downstream collection group being spaced from one another as viewed in a the second lateral direction at least along a portion of their extents sufficient to permit light that has traveled past the second ingress to be viewed by an observer exteriorly of the second passageway. The arrangement further includes the first and second view windows of the first and second passageways of the downstream collection group being located downstream of corresponding first and second view windows of the first and second passageways of the upstream collection group relative to the advancing direction of the travel portion along the circular path such that, during each full cycle travel of the travel portion of the advancing device along the circular path, the first and second view windows of the first and second passageways of the downstream collection group cyclically travel past a given location on the circular path before corresponding first and second view windows of the first and second passageways of the upstream collection group have traveled past the given location. The arrangement further includes the center of the areas of the first and second view windows of the first and second passageways of the upstream collection group lying on a collection circle having a radius less than the radius of the circular path. The arrangement further includes the center of the areas of the first and second view windows of the first and second passageways of the downstream collection group lying on a collection circle having a radius less than the radius of the circular path. The arrangement further includes a selected one of the first and second passageways of the upstream collection group and a selected one of the first and second passageways of downstream collection group being in a coordinated relationship with one another. The selected one passageway of the upstream collection group is deemed to be the upstream coordinated passageway and the selected one passageway of the downstream collection group is deemed to be the downstream coordinated passageway. The upstream coordinated passageway delimits a reference bisector plane extending in one of a corresponding first and second length direction of the upstream coordinated passageway and bisecting one of a corresponding first and second view windows of the upstream coordinated passageway such that one-half of the area of the one of a corresponding first and second view windows lies on one side of the reference bisector plane and the other half of the area of the one of a corresponding first and second view windows lies on the opposite side of the reference bisector plane. The downstream coordinated passageway delimits an offset bisector plane extending in one of a corresponding first and second length direction of the downstream coordinated passageway and bisecting one of a corresponding first and second view windows of the downstream coordinated passageway such that one-half of the area of the one of a corresponding first and second view windows lies on one side of the offset bisector plane and the other half of the area of the one of a corresponding first and second view windows lies on the opposite side of the offset bisector plane. The arrangement further includes the reference bisector plane of the upstream coordinated passageway and the offset bisector plane of the downstream coordinated passageway being at an offset angle to one another.

In another embodiment, an arrangement for presenting a display, the arrangement comprising an advancing device, the advancing device having a travel portion and being operable to cyclically advance the travel portion along a circular path in an advancing direction, and the circular path having a radius and the travel portion moving in an angular direction relative to the circular path. The arrangement further includes an upstream collection group, the upstream collection group delimiting at least two sight-reducing elements supported on the travel portion of the advancing device for advancing movement thereby. The arrangement further includes a downstream collection group, the downstream collection group delimiting at least two sight-reducing elements supported on the travel portion of the advancing device for advancing movement thereby. The arrangement further includes an ingress associated with each of the upstream sight-reducing elements, each ingress delimiting a threshold through which light travels. The arrangement further includes a first view window associated with each of the upstream sight-reducing elements, wherein light at the first view window can be viewed by an observer located at a given angular location relative to the circular path. The arrangement further includes the first view window having a display range available at each angular position of the first view window that delimits an available angular extent within which the first view window is viewable. The arrangement further includes wherein, across a plurality of different angular positions of the display range that the display range occupies as the first view window displaces angularly during the advancing movement, observers who have a line of sight to the display range can view light at the first view window through a predetermined extent of angular displacement of the first view window. The arrangement further includes an ingress associated with each of the downstream sight-reducing elements, each ingress delimiting a threshold through which light travels. The arrangement further includes a second view window associated with each of the downstream sight-reducing elements. Light at the second view window can be viewed by an observer located at a given angular location relative to the circular path. The arrangement further includes the second view window having a display range available at each angular position of the second view window that delimits an available angular extent within which the second view window is viewable. The arrangement further includes wherein, across a plurality of different angular positions of the display range that the display range occupies as the second view window displaces angularly during the advancing movement, observers who have a line of sight to the display range can view light at the second view window through a predetermined extent of angular displacement of the second view window. The arrangement further includes the second view window associated with the downstream collection group being located downstream of a corresponding first view window associated with the upstream collection group relative to the advancing direction of the travel portion along the circular path such that, during each full cycle travel of the travel portion of the advancing device along the circular path, each second view window associated with the downstream collection group cyclically travel past a given location on the circular path before the corresponding first view window associated with the upstream collection group have traveled past the given location. The arrangement further includes the first view window having a first lateral dimension, and a first height dimension perpendicular to the first lateral dimension that together delimit the area of the first view window and having a first length extent perpendicular to the first lateral dimension and the first height dimension. The arrangement further includes the second view window having a second lateral dimension, and a second height dimension perpendicular to the second lateral dimension that together delimit the area of the second view window and having a second length extent perpendicular to the second lateral dimension and the second height dimension. The arrangement further includes a respective one of the at least two upstream sight-reducing elements being a lagging upstream sight-reducing element and being located relative to a forward upstream sight-reducing element of the at least two upstream sight-reducing elements such that the lagging upstream sight-reducing element, during each full cycle travel of the travel portion of the advancing device along the circular path, reduces the percentage of the display range of a corresponding one of a first and second view windows of the forward upstream sight-reducing element available within the line of sight of an observer remaining at a fixed angular location. The arrangement further includes, during each cycle of travel, the display range of the corresponding one of a first and second view windows of the forward upstream sight-reducing element is available to an observer remaining at a fixed angular location such that the observer is able to cyclically view the display range of the corresponding one of a first and second view windows of the forward upstream sight-reducing element through a predetermined extent of angular displacement of the corresponding one of a first and second view windows and the lagging upstream sight-reducing element progressively reduces to zero the percentage of the display range of the corresponding one of a first and second view windows of the forward upstream sight-reducing element available to be viewed by the observer. The arrangement further includes a respective one of the at least two downstream sight-reducing elements being a lagging downstream sight-reducing element and being located relative to a forward downstream sight-reducing element of the at least two downstream sight-reducing elements such that the lagging downstream sight-reducing element, during each full cycle travel of the travel portion of the advancing device along the circular path, reduces the percentage of the display range of a corresponding one of a first and second view windows of the forward downstream sight-reducing element available within the line of sight of an observer remaining at a fixed angular location. The arrangement further includes, during each cycle of travel, the display range of the corresponding one of the first and second view window of the forward downstream sight-reducing element is available to an observer remaining at a fixed angular location such that the observer is able to cyclically view the display range of the corresponding one of the first and second view windows of the forward downstream sight-reducing element through a predetermined extent of angular displacement of the corresponding one of the first and second view windows and the lagging downstream sight-reducing element progressively reduces to zero the percentage of the display range of the corresponding one of the first and second view windows of the forward downstream sight-reducing element available to be viewed by the observer. The arrangement further includes at least a selected one of the one pair of the lagging upstream sight-reducing element and the lagging downstream sight-reducing element or the other pair of the forward upstream sight-reducing element and the forward downstream sight-reducing element being an operatively associated pair in a manner in which a corresponding at least one of the first and second view windows of the operatively associated pair have a predetermined orientation with one another. The arrangement further includes the corresponding at least one of the first and second view windows of the respective one of the lagging upstream sight-reducing element or the forward upstream sight-reducing element of the operatively associated pair delimiting a reference bisector plane extending in a corresponding at least one of the first and second length direction of the corresponding at least one of the first and second view window such that one-half of the area of the corresponding at least one of the first and second view window lies on one side of the reference bisector plane. The arrangement further includes the other half of the area of the corresponding at least one of the first and second view windows lies on the opposite side of the reference bisector plane and the corresponding at least one of the first and second view windows of the respective one of the lagging downstream sight-reducing element or the forward downstream sight-reducing element of the operatively associated pair delimiting an offset bisector plane extending in the corresponding at least one of the first and second length direction of the view corresponding at least one of the first and second windows such that one-half of the area of the corresponding at least one of the first and second view windows lies on one side of the offset bisector plane and the other half of the area of the corresponding at least one of the first and second view windows lies on the opposite side of the offset bisector plane. The arrangement further includes the reference bisector plane of the corresponding at least one of the first and second view windows of the respective upstream sight-reducing element and the offset bisector plane of the corresponding at least one of the first and second view windows of the respective downstream sight-reducing element being at an offset angle to one another greater than zero.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An arrangement for presenting a display, the arrangement comprising:

an advancing device, the advancing device having a travel portion and being operable to cyclically advance the travel portion along a circular path in an advancing direction;
an upstream collection group, the upstream collection group having at least a first pair of passageway portions and a second pair of passageway portions;
a downstream collection group, the downstream collection group having at least a first pair of passageway portions and a second pair of passageway portions,
each of the first pair of passageway portions of the upstream collection group and the downstream collection group being supported on the travel portion of the advancing device for advancing movement thereby, and each of the first pair of passageway portions of the upstream collection group and the downstream collection group delimiting a first passageway having a first length direction, a first lateral direction perpendicular to the first length direction, and a first height direction perpendicular to the first length direction and the first lateral direction;
a first ingress, the first ingress delimiting a threshold through which light travels into the first passageway, a respective area of the first passageway, as viewed in the first lateral and first height directions, having light passing therethrough and being deemed a first view window of the first passageway, wherein light at the first view window can be viewed by an observer and the first pair of passageway portions of the upstream collection group and the downstream collection group being spaced from one another as viewed in the first lateral direction of the first passageway at least along a portion of their extents beyond the first view window as viewed in the first length direction to permit light that has traveled past the first ingress to be viewed by an observer exteriorly of the first passageway; and
each of the second pair of passageway portions of the upstream collection group and the downstream collection group being supported on the travel portion of the advancing device for advancing movement thereby and delimiting a second passageway having a second length direction, a second lateral direction perpendicular to the second length direction, and a second height direction perpendicular to the second length direction and the second lateral direction;
a second ingress, the second ingress delimiting a threshold through which light travels into the second passageway, a respective area of the second passageway, as viewed in the second lateral and second height directions, having light passing therethrough and being deemed a second view window of the second passageway, wherein light at the second view window can be viewed by the observer and the second pair of passageway portions of the upstream collection group and the downstream collection group being spaced from one another as viewed in the second lateral direction at least along a portion of their extents sufficient to permit light that has traveled past the second ingress to be viewed by an observer exteriorly of the second passageway,
the first and second view windows of the first and second passageways of the downstream collection group being located downstream of corresponding first and second view windows of the first and second passageways of the upstream collection group relative to the advancing direction of the travel portion along the circular path such that, during each full cycle travel of the travel portion of the advancing device along the circular path, the first and second view windows of the first and second passageways of the downstream collection group cyclically travel past a given location on the circular path before corresponding first and second view windows of the first and second passageways of the upstream collection group have traveled past the given location, the center of the areas of the first and second view windows of the first and second passageways of the upstream collection group lying on a collection circle having a radius less than the radius of the circular path;

the center of the areas of the first and second view windows of the first and second passageways of the downstream collection group lying on a collection circle having a radius less than the radius of the circular path, a selected one of the first and second passageways of the upstream collection group and a selected one of the first and second passageways of downstream collection group being in a coordinated relationship with one another, wherein the selected one passageway of the upstream collection group is deemed to be the upstream coordinated passageway and the selected one passageway of the downstream collection group is deemed to be the downstream coordinated passageway, the upstream coordinated passageway delimits a reference bisector plane extending in one of a corresponding first and second length direction of the upstream coordinated passageway and bisecting one of a corresponding first and second view windows of the upstream coordinated passageway such that one-half of the area of the one of a corresponding first and second view windows lies on one side of the reference bisector plane and the other half of the area of the one of a corresponding first and second view windows lies on the opposite side of the reference bisector plane, the downstream coordinated passageway delimits an offset bisector plane extending in one of a corresponding first and second length direction of the downstream coordinated passageway and bisecting one of a corresponding first and second view windows of the downstream coordinated passageway such that one-half of the area of the one of a corresponding first and second view windows lies on one side of the offset bisector plane and the other half of the area of the one of a corresponding first and second view windows lies on the opposite side of the offset bisector plane, and the reference bisector plane of the upstream coordinated passageway and the offset bisector plane of the downstream coordinated passageway being at an offset angle to one another.

2. The arrangement for presenting a display according to claim 1, wherein the offset angle has a value between one degree and twenty degrees.

3. The arrangement for presenting a display according to claim 1, wherein the offset angle has a value of nine degrees.

4. An arrangement for presenting a display, the arrangement comprising:

an advancing device, the advancing device having a travel portion and being operable to cyclically advance the travel portion along a circular path in an advancing direction, the circular path having a radius and the travel portion moving in an angular direction relative to the circular path;

an upstream collection group, the upstream collection group delimiting at least two sight-reducing elements supported on the travel portion of the advancing device for advancing movement thereby;

a downstream collection group, the downstream collection group delimiting at least two sight-reducing elements supported on the travel portion of the advancing device for advancing movement thereby, an ingress associated with each of the upstream sight-reducing elements, each ingress delimiting a threshold through which light travels, a first view window associated with each of the upstream sight-reducing elements, wherein light at the first view window can be viewed by an observer located at a given angular location relative to the circular path, the first view window having a display range available at each angular position of the first view window that delimits an available angular extent within which the first view window is viewable, wherein, across a plurality of different angular positions of the display range that the display range occupies as the first view window displaces angularly during the advancing movement, observers who have a line of sight to the display range can view light at the first view window through a predetermined extent of angular displacement of the first view window, an ingress associated with each of the downstream sight-reducing elements, each ingress delimiting a threshold through which light travels, a second view window associated with each of the downstream sight-reducing elements, wherein light at the second view window can be viewed by an observer located at a given angular location relative to the circular path, the second view window having a display range available at each angular position of the second view window that delimits an available angular extent within which the second view window is viewable, wherein, across a plurality of different angular positions of the display range that the display range occupies as the second view window displaces angularly during the advancing movement, observers who have a line of sight to the display range can view light at the second view window through a predetermined extent of angular displacement of the second view window, the second view window associated with the downstream collection group being located downstream of a corresponding first view window associated with the upstream collection group relative to the advancing direction of the travel portion along the circular path such that, during each full cycle travel of the travel portion of the advancing device along the circular path, each second view window associated with the downstream collection group cyclically travel past a given location on the circular path before the corresponding first view window associated with the upstream collection group have traveled past the given location, the first view window having a first lateral dimension, and a first height dimension perpendicular to the first lateral dimension that together delimit the area of the first view window and having a first length extent perpendicular to the first lateral dimension and the first height dimension, the second view window having a second lateral dimension, and a second height dimension perpendicular to the second lateral dimension that together delimit the area of the second view window and having a second length extent perpendicular to the second lateral dimension and the second height dimension, a respective one of the at least two upstream sight-reducing elements being a lagging upstream sight-reducing element and being located relative to a forward upstream sight-reducing element of the at least two upstream sight-reducing elements such that the lagging upstream sight-reducing element, during each full cycle travel of the travel portion of the advancing device along the circular path, reduces the percentage of the display range of a corresponding one of a first and second view windows of the forward upstream sight-reducing element available within the line of sight of an observer remaining at a fixed angular location, whereupon, during each cycle of travel, the display range of the corresponding one of a first and second view windows of the forward upstream sight-reducing element is available to an observer remaining at a fixed angular location such that the observer is able to cyclically view the display range of the corresponding one of a first and second view windows of the forward upstream sight-reducing element through a predetermined extent of angular displacement of the corresponding one of a first and second view windows and the lagging upstream sight-reducing element progressively reduces to zero the percentage of the display range of the corresponding one of a first and second view windows of the forward upstream sight-reducing element available to be viewed by the observer, a respective one of the at least two downstream sight-reducing elements being a lagging downstream sight-reducing element and being located relative to a forward downstream sight-reducing element of the at least two downstream sight-reducing elements such that the lagging downstream sight-reducing element, during each full cycle travel of the travel portion of the advancing device along the circular path, reduces the percentage of the display range of a corresponding one of a first and second view windows of the forward downstream sight-reducing element available within the line of sight of an observer remaining at a fixed angular location, whereupon, during each cycle of travel, the display range of the corresponding one of the first and second view window of the forward downstream sight-reducing element is available to an observer remaining at a fixed angular location such that the observer is able to cyclically view the display range of the corresponding one of the first and second view windows of the forward downstream sight-reducing element through a predetermined extent of angular displacement of the corresponding one of the first and second view windows and the lagging downstream sight-reducing element progressively reduces to zero the percentage of the display range of the corresponding one of the first and second view windows of the forward downstream sight-reducing element available to be viewed by the observer, at least a selected one of the one pair of the lagging upstream sight-reducing element and the lagging downstream sight-reducing element or the other pair of the forward upstream sight-reducing element and the forward downstream sight-reducing element being an operatively associated pair in a manner in which a corresponding at least one of the first and second view windows of the operatively associated pair have a predetermined orientation with one another, with the corresponding at least one of the first and second view windows of the respective one of the lagging upstream sight-reducing element or the forward upstream sight-reducing element of the operatively associated pair delimiting a reference bisector plane extending in a corresponding at least one of the first and second length direction of the corresponding at least one of the first and second view window such that one-half of the area of the corresponding at least one of the first and second view window lies on one side of the reference bisector plane and the other half of the area of the corresponding at least one of the first and second view windows lies on the opposite side of the reference bisector plane and the corresponding at least one of the first and second view windows of the respective one of the lagging downstream sight-reducing element or the forward downstream sight-reducing element of the operatively associated pair delimiting an offset bisector plane extending in the corresponding at least one of the first and second length direction of the view corresponding at least one of the first and second windows such that one-half of the area of the corresponding at least one of the first and second view windows lies on one side of the offset bisector plane and the other half of the area of the corresponding at least one of the first and second view windows lies on the opposite side of the offset bisector plane, and the reference bisector plane of the corresponding at least one of the first and second view windows of the respective upstream sight-reducing element and the offset bisector plane of the corresponding at least one of the first and second view windows of the respective downstream sight-reducing element being at an offset angle to one another greater than zero.

5. The arrangement for presenting a display according to claim 4, wherein each image-display surface is radially inward of the respective pair of view-restricting elements between which it is disposed.

6. The arrangement for presenting a display according to claim 4, wherein the rotatable element has a center about which the rotatable element is rotatable and a first one of the image displaying portions includes a plurality of slots each providing a view window through which light passes, a second one of the image displaying portions includes an identical number of slots as the first one of the image displaying portions, the slots of the first one of the image displaying portions are distributed angularly at uniform angular spacings about a predetermined angular extent that is less than a full circumferential angular extent, the first one of the image displaying portions is mounted relative to a circular path centered on the center of the rotatable element such that the predetermined angular extent of the slots is bisected by a radius that is tangent to the circular path and the slots of the second one of the image displaying portions are distributed angularly at uniform angular spacings about a predetermined angular extent that is less than a full circumferential angular extent, the second one of the image displaying portions is mounted relative to the circular path such that the predetermined angular extent of the slots is bisected by a radius that is not tangent to the circular path.

* * * * *